(12) United States Patent
Winiecki

(10) Patent No.: US 9,797,670 B2
(45) Date of Patent: Oct. 24, 2017

(54) METHOD OF MONITORING AND TRIGGER-LOCKING A FIREARM

(71) Applicant: Kenneth Carl Steffen Winiecki, Cupertino, CA (US)

(72) Inventor: Kenneth Carl Steffen Winiecki, Cupertino, CA (US)

(*) Notice: Subject to any disclaimer, the term of this patent is extended or adjusted under 35 U.S.C. 154(b) by 0 days.

(21) Appl. No.: 15/355,050

(22) Filed: Nov. 17, 2016

(65) Prior Publication Data

US 2017/0074611 A1     Mar. 16, 2017

Related U.S. Application Data

(63) Continuation-in-part of application No. PCT/US2015/038644, filed on Jun. 30, 2015, and a continuation-in-part of application No. PCT/IB2016/052611, filed on May 6, 2016, and a continuation-in-part of application No. 15/355,012, filed on Nov. 17, 2016.

(51) Int. Cl.
*F41A 17/00*     (2006.01)
*F41A 17/06*     (2006.01)
*F41A 17/46*     (2006.01)
*G01S 19/14*     (2010.01)
*H02J 7/02*      (2016.01)

(52) U.S. Cl.
CPC .......... *F41A 17/066* (2013.01); *F41A 17/063* (2013.01); *F41A 17/46* (2013.01); *G01S 19/14* (2013.01); *H02J 7/025* (2013.01)

(58) Field of Classification Search
CPC ....... F41A 17/063; F41A 17/066; F41A 17/46
USPC ............................................. 42/70.01, 70.06
See application file for complete search history.

(56) References Cited

U.S. PATENT DOCUMENTS

| | | | |
|---|---|---|---|
| 6,412,207 B1 * | 7/2002 | Crye | F41A 17/02 42/70.01 |
| 6,477,801 B1 * | 11/2002 | O'dwyer | F41A 17/066 42/70.01 |
| 6,823,621 B2 * | 11/2004 | Gotfried | F41A 17/066 42/70.01 |

* cited by examiner

*Primary Examiner* — Samir Abdosh

(57) ABSTRACT

Disclosed is a monitoring and trigger-locking a firearm.

18 Claims, 27 Drawing Sheets

METHOD OF MONITORING AND TRIGGER-LOCKING A FIREARM

The current application claims a priority to the U.S. Provisional Patent application Ser. No. 62/256,543 filed on Nov. 17, 2015 and a priority to the U.S. Provisional Patent application Ser. No. 62/262,716 filed on Dec. 3, 2015.

FIELD OF THE INVENTION

The present invention generally relates to a firearm with computer-executable safety features. More specifically, the present invention is able to monitor a firearm, to lock the trigger of a firearm, or to inductively recharge the firearm based on situational data of the firearm.

BACKGROUND OF THE INVENTION

Firearm safety has been a growing concern for many years. Most, if not all violent crimes are committed by criminals through the use of a weapon that is not their own. Further, school shootings and the like are carried out through the use of firearms owned by family members or people associated to the shooter. The present invention deters criminals from using other people's firearms, but more importantly, make that weapon unusable to the person who has it unlawfully. The deterrence stems from the fact that the firearm is unusable unless that person has been granted permission. The present invention provides a biometric authentication system that only the owner and anyone granted permission can use. Another advantage associated with this system is that law abiding citizens living in the same residence as convicted felons can own firearms when utilizing the present invention. Currently, convicted felons are not allowed to have firearms in the location of their residence. In this regard, law abiding citizens living within the same location are not permitted to own any firearms. Because the firearms are rendered useless to anyone not registered (or programmed) into the system, felons cannot discharge the firearm even if they manage to get their hands on them, therefore making it safe for firearms to be present within the residence of felons.

Current methods of identifying the shooter and time in relation to discharging the firearm is a very complex and tedious process which requires expensive lab work. Therefore, there is a need for a means that can be used to conveniently identify who discharges the firearm. The present invention records data relating to when the firearm is discharged (timestamps), who the individual discharging the firearm is (biometric identification data) as well as the geospatial location that the firearm is being discharged at. This allows law enforcement officials to review recorded data to facilitate in their investigation, providing further insight into the incident.

Many devices have been created for the purpose of attempting to make firearms safer. Examples of these devices include trigger locks, firearm lockboxes, etc. However, such devices only address the safety of the firearms in terms of access. There are currently no devices or methods that provide safety in terms of accessing the firearm as well as disassembly and cleaning. There are many incidents where a firearm owner accidently shoots themselves or another person while cleaning their firearm. With the present invention implemented, the trigger of the firearm can be locked, eliminating any chance of accidental discharge.

DETAILED DESCRIPTION OF THE INVENTION

Figure 1A:
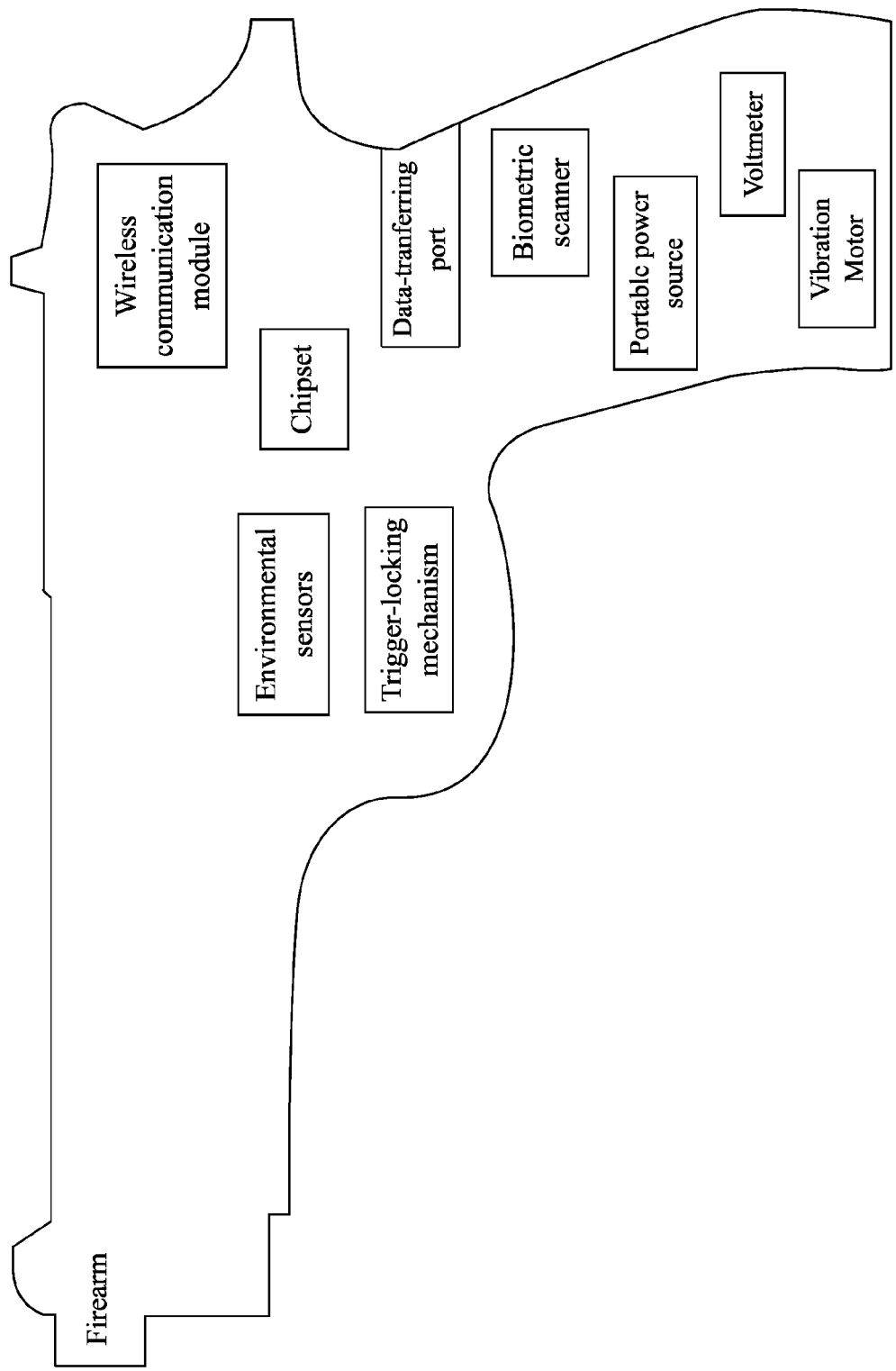
FIG. 1A is a block diagram illustrating the system for the "smart" firearm.
Figure 1B:
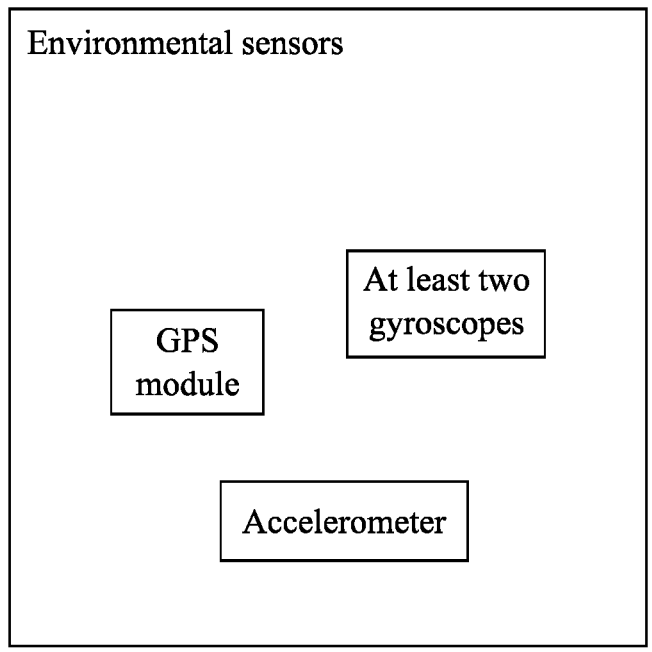
FIG. 1B is a block diagram illustrating the environmental sensors used by the "smart" firearm.
Figure 2:
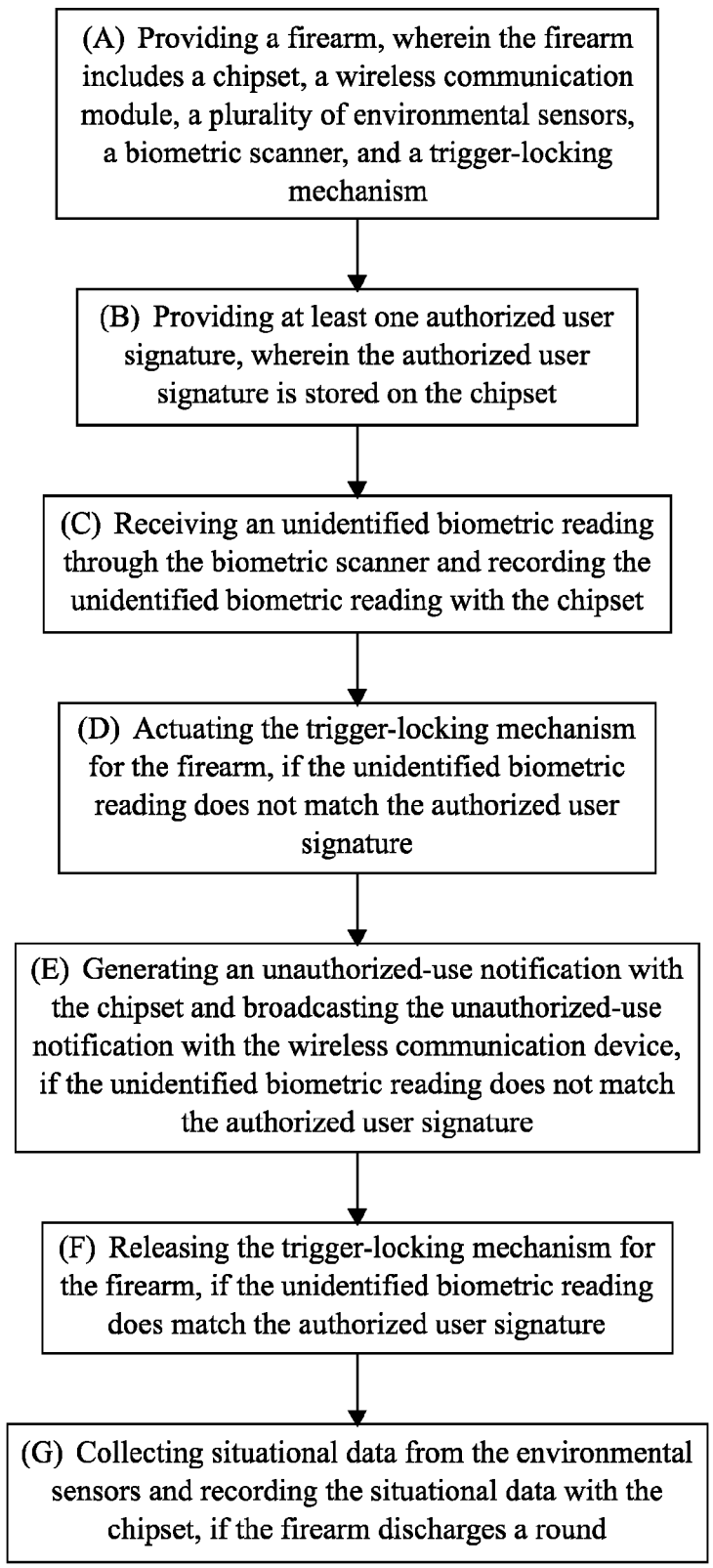
FIG. 2 is a flowchart illustrating the overall process executed by the "smart" firearm.
Figure 3:
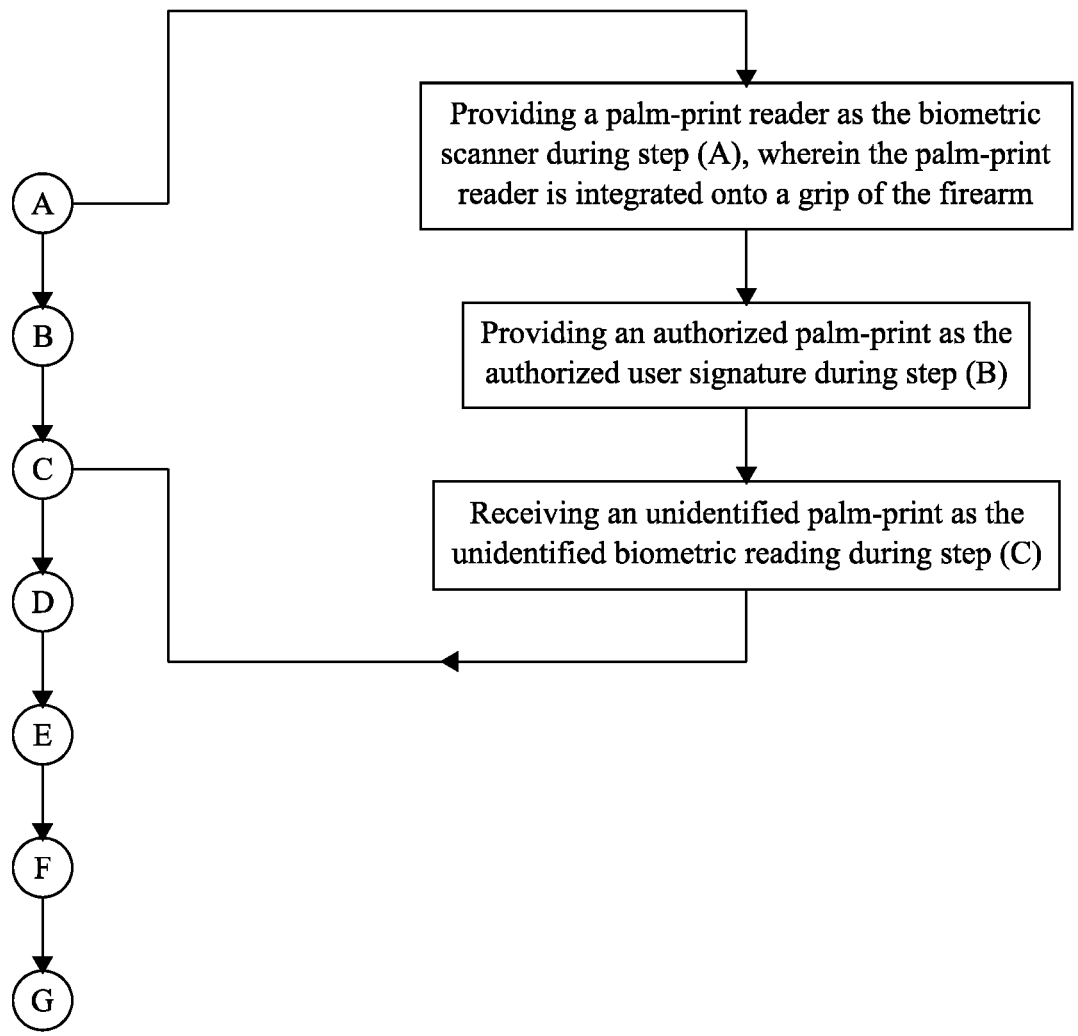
FIG. 3 is a flowchart illustrating the steps associated with using a palm-print reader as the biometric scanner.
Figure 4:
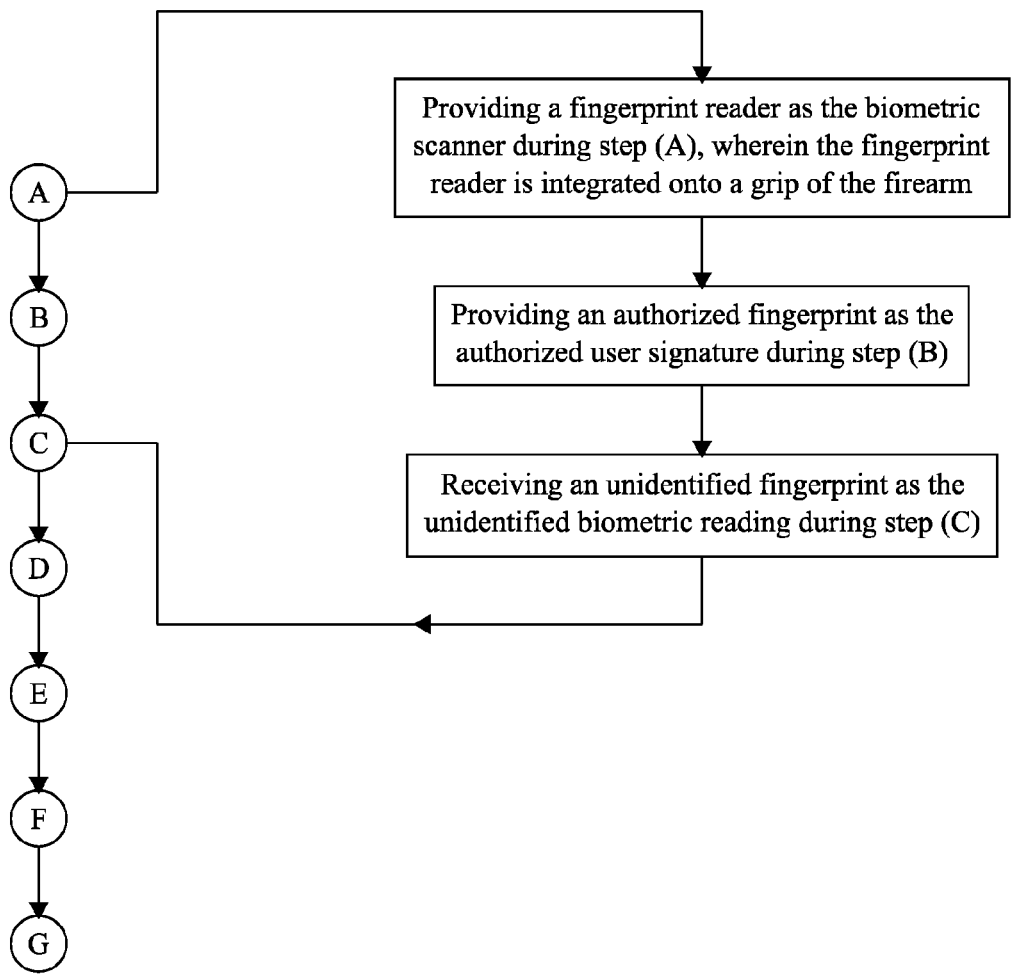
FIG. 4 is a flowchart illustrating the steps associated with using a fingerprint reader as the biometric scanner.
Figure 5:
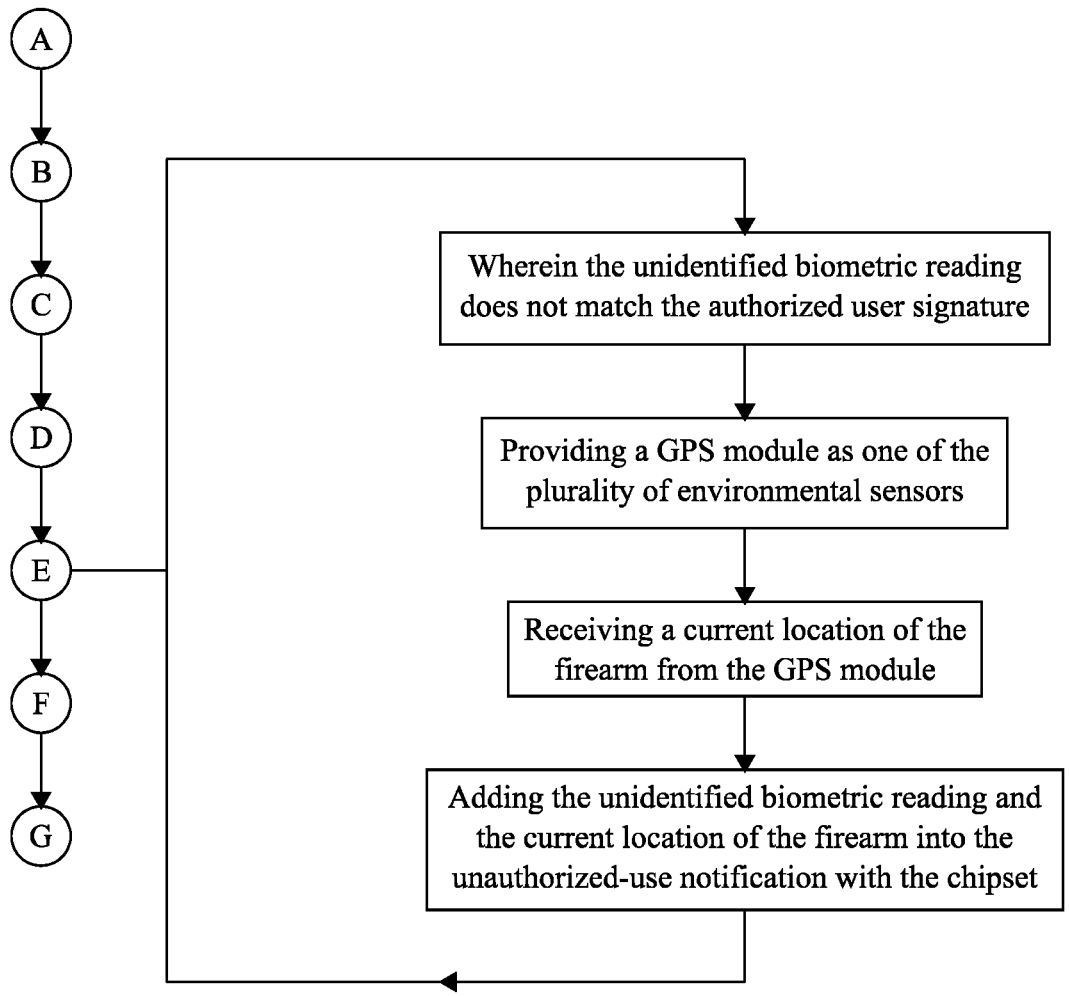
FIG. 5 is a flowchart illustrating steps associated with what pieces of information are added to the unauthorized-use notification.
Figure 6:
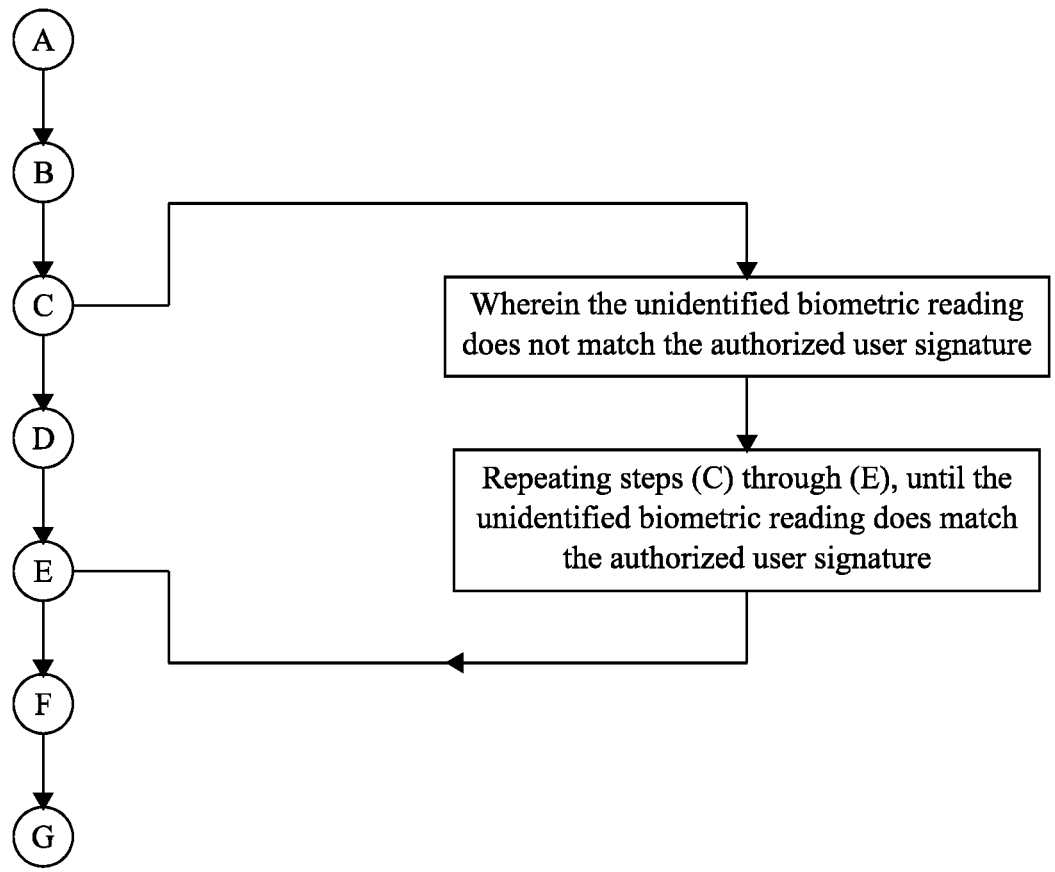
FIG. 6 is a flowchart illustrating steps associated with directly sending the unauthorized-use notification to an authorized user of the "smart" firearm.
Figure 7:
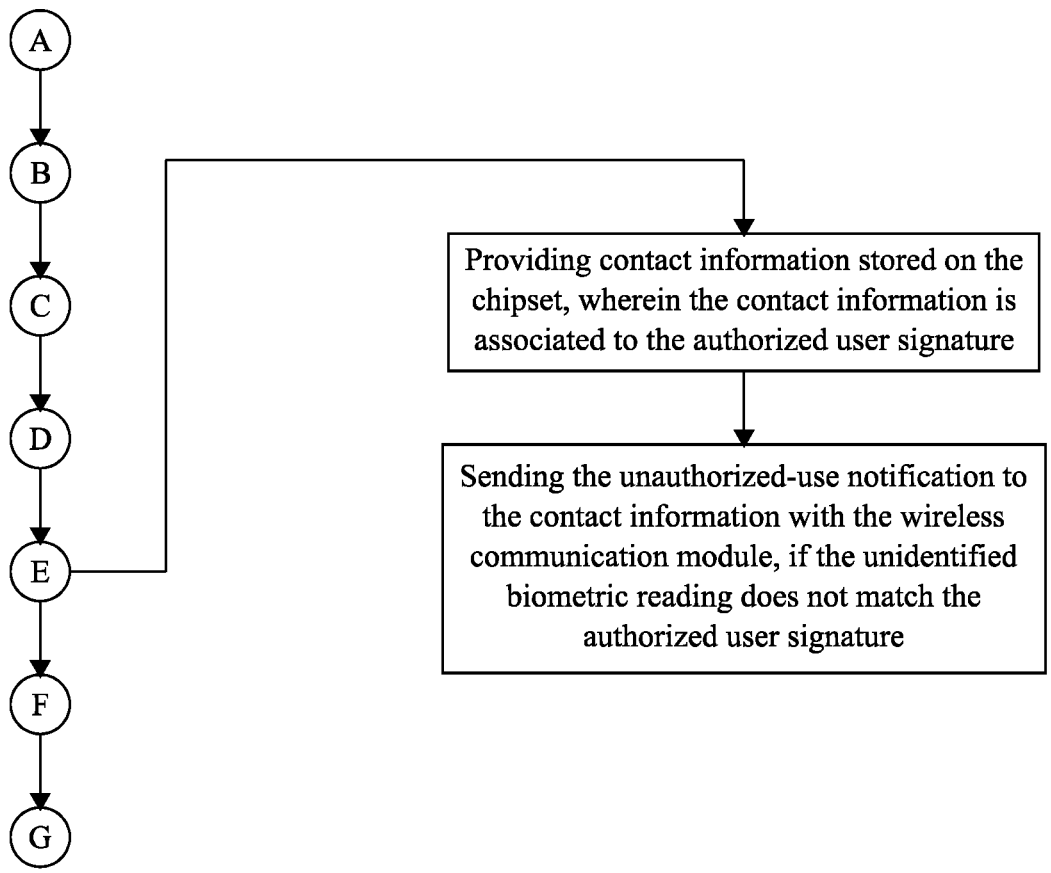
FIG. 7 is a flowchart illustrating steps associated with continuously broadcasting the unauthorized-use notification until an authorized user handles the "smart" firearm.
Figure 8:
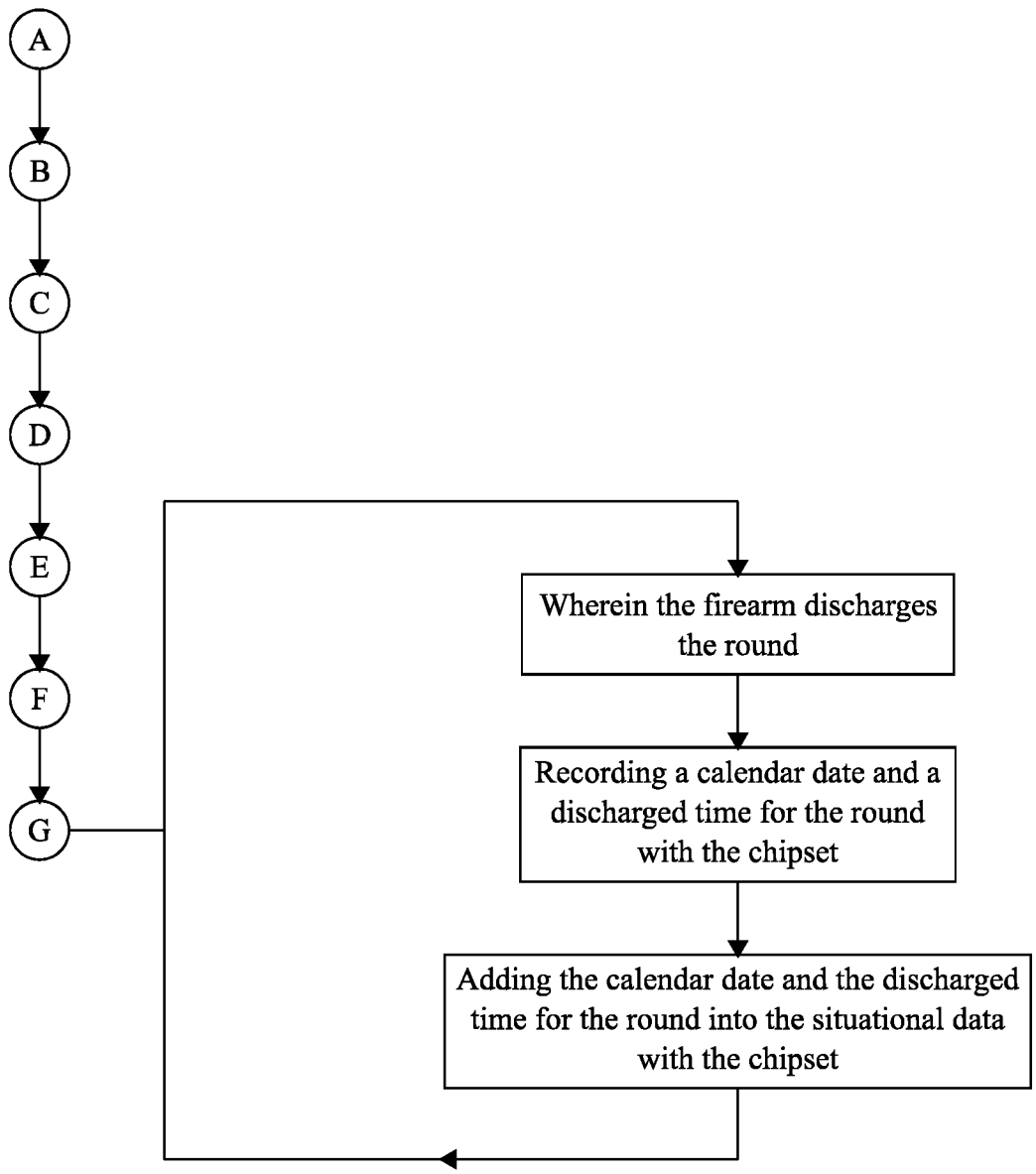
FIG. 8 is a flowchart illustrating steps associated with adding the calendar date and time to the situational data.
Figure 9:
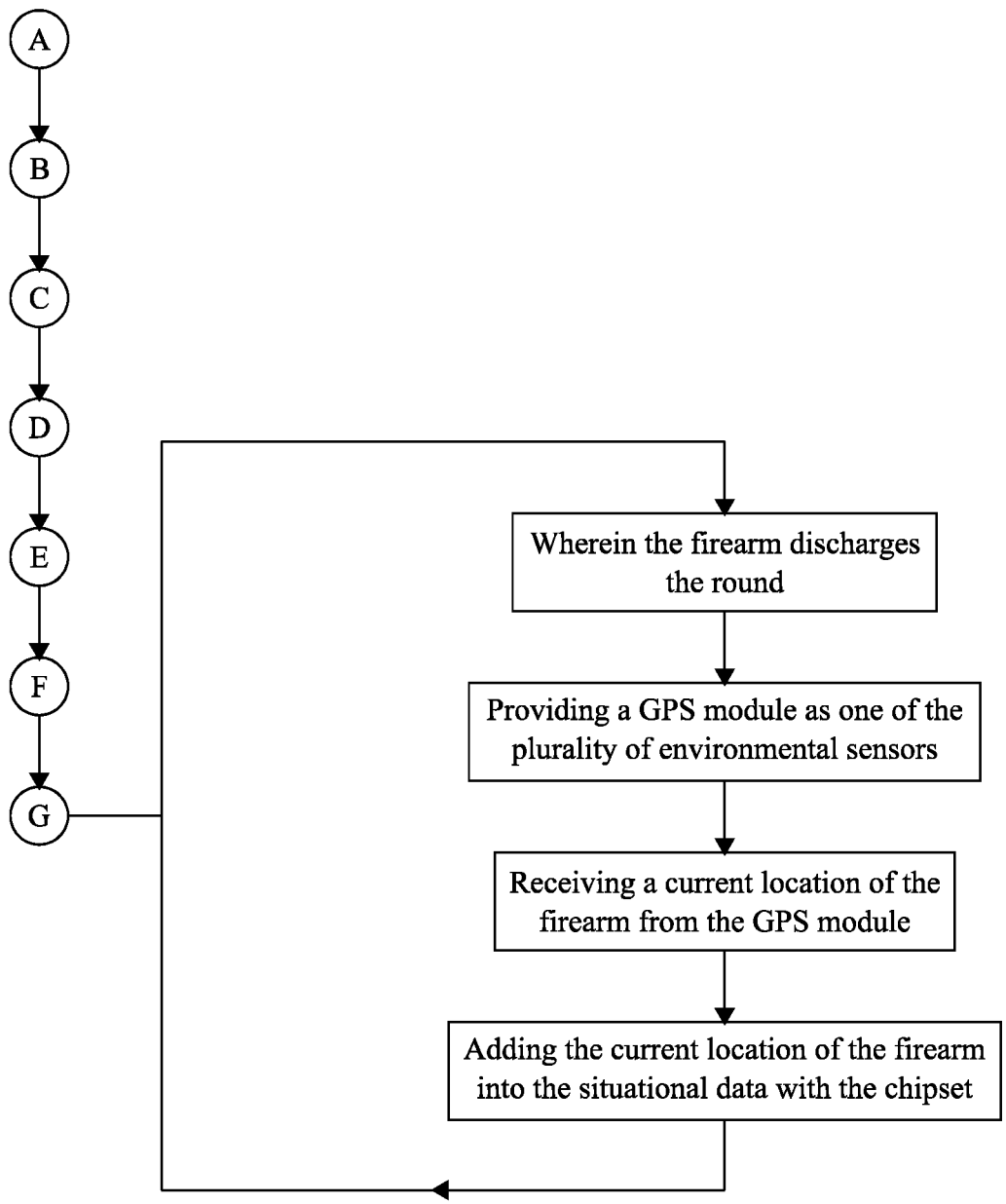
FIG. 9 is a flowchart illustrating steps associated with adding the "smart" firearm's location to the situational data.
Figure 10:
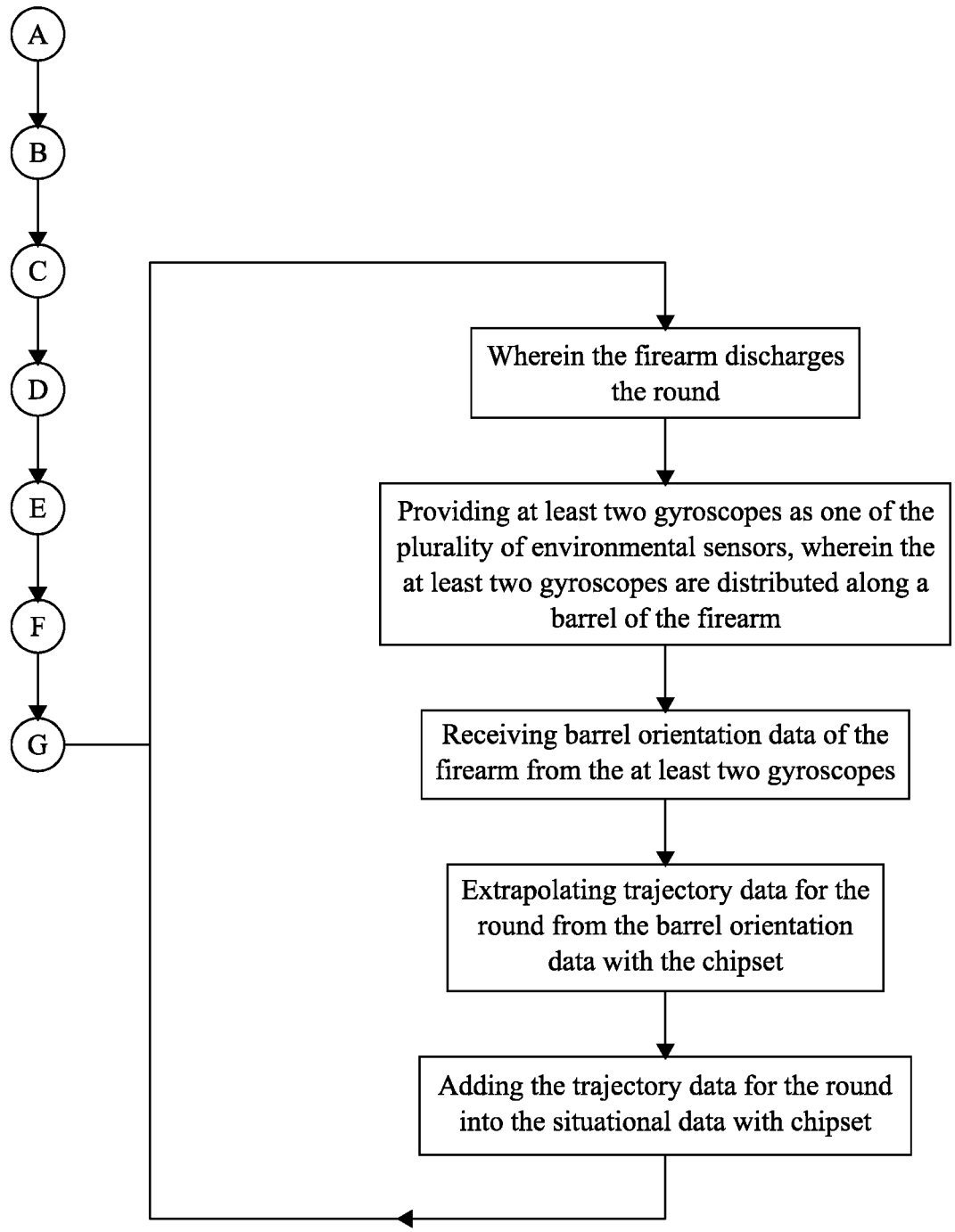
FIG. 10 is a flowchart illustrating steps associated with adding the round's trajectory to the situational data.
Figure 11:
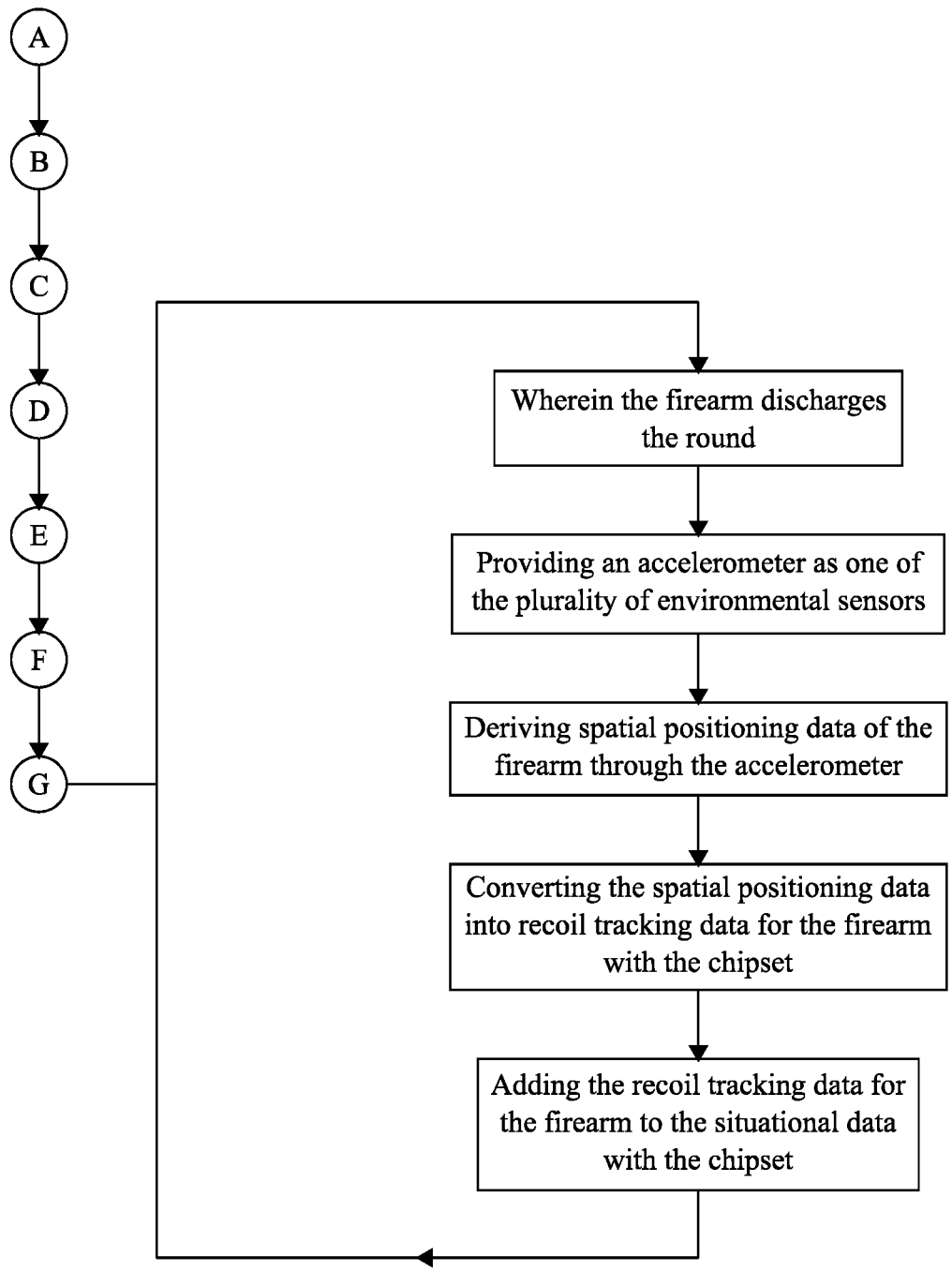
FIG. 11 is a flowchart illustrating steps associated with adding the tracking data of the "smart" firearm's recoil to the situational data.
Figure 12:
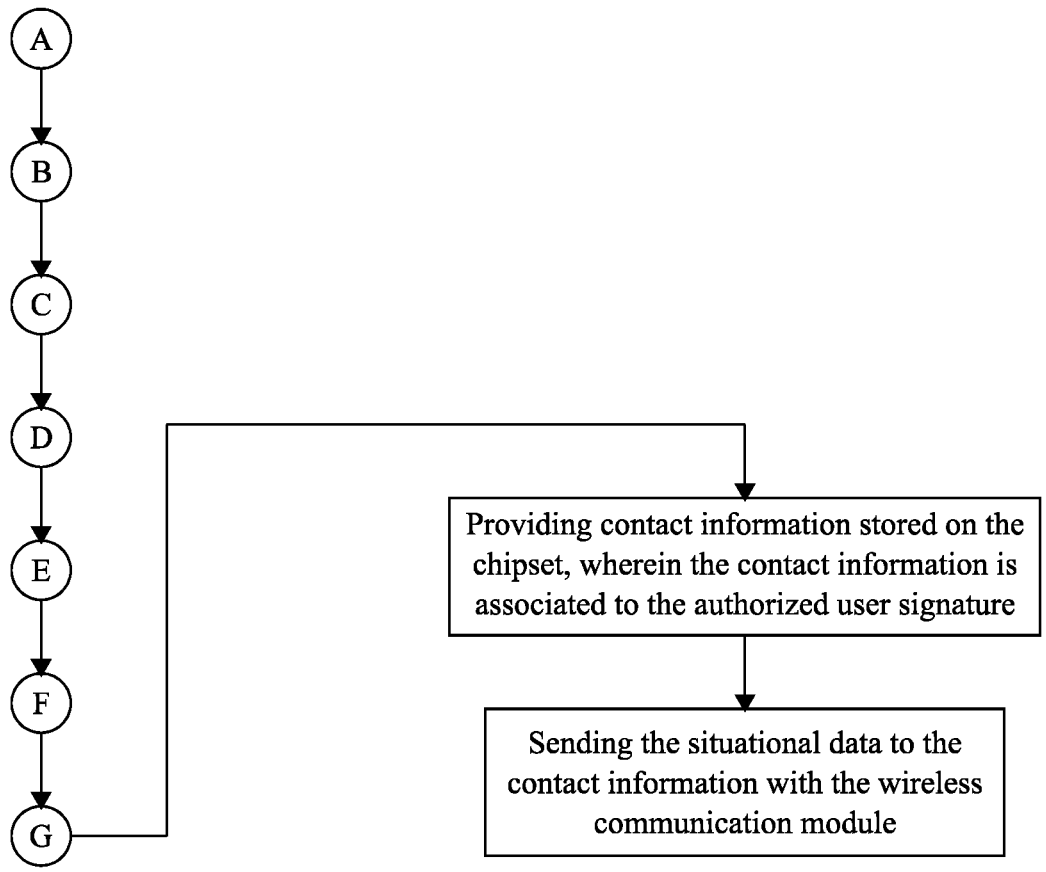
FIG. 12 is a flowchart illustrating steps associated with directly sending the situational data to an authorized user of the "smart" firearm.
Figure 13:
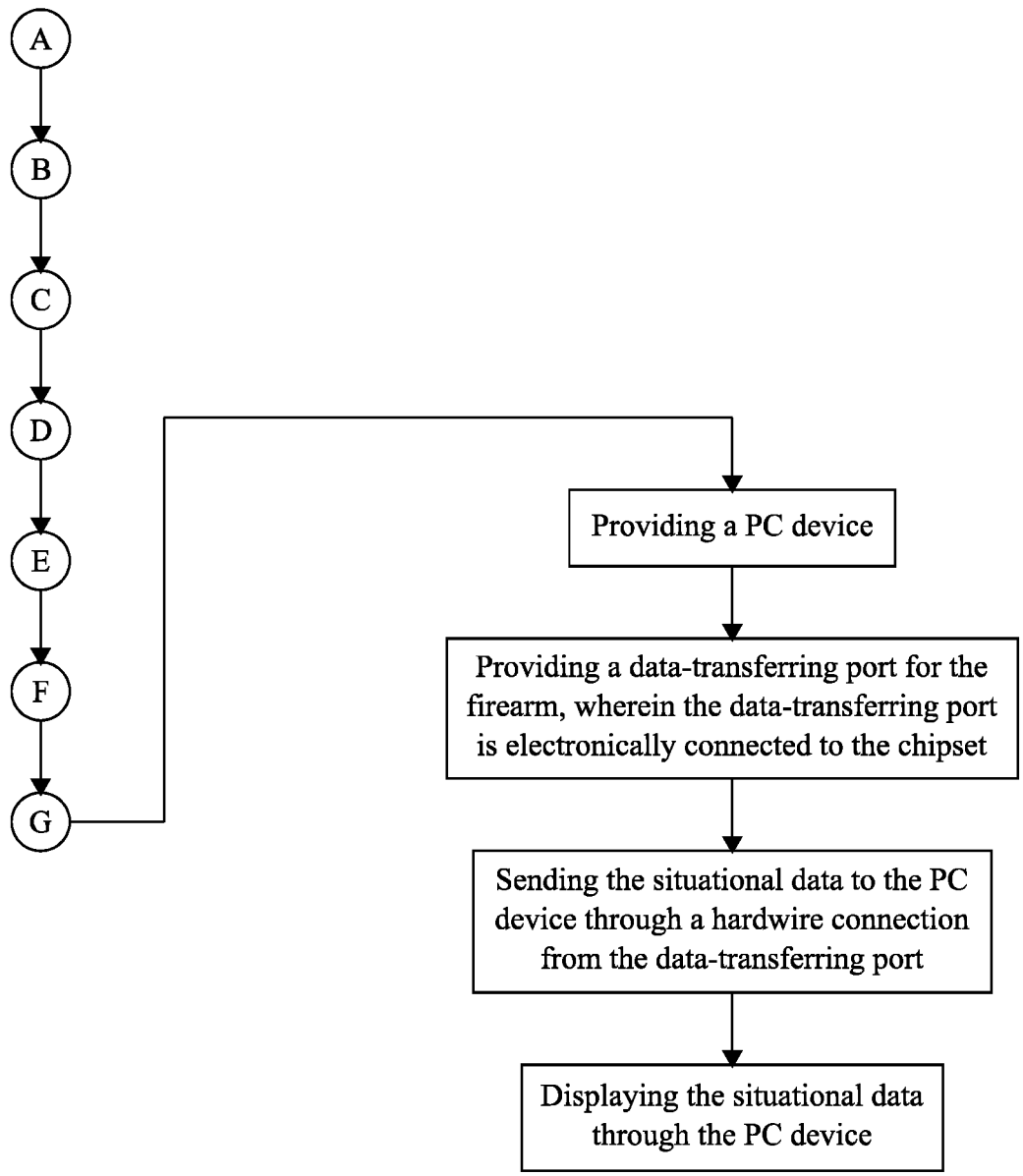
FIG. 13 is a flowchart illustrating steps associated with extracting the situational data from the "smart" firearm through a hardwire connection.
Figure 14:
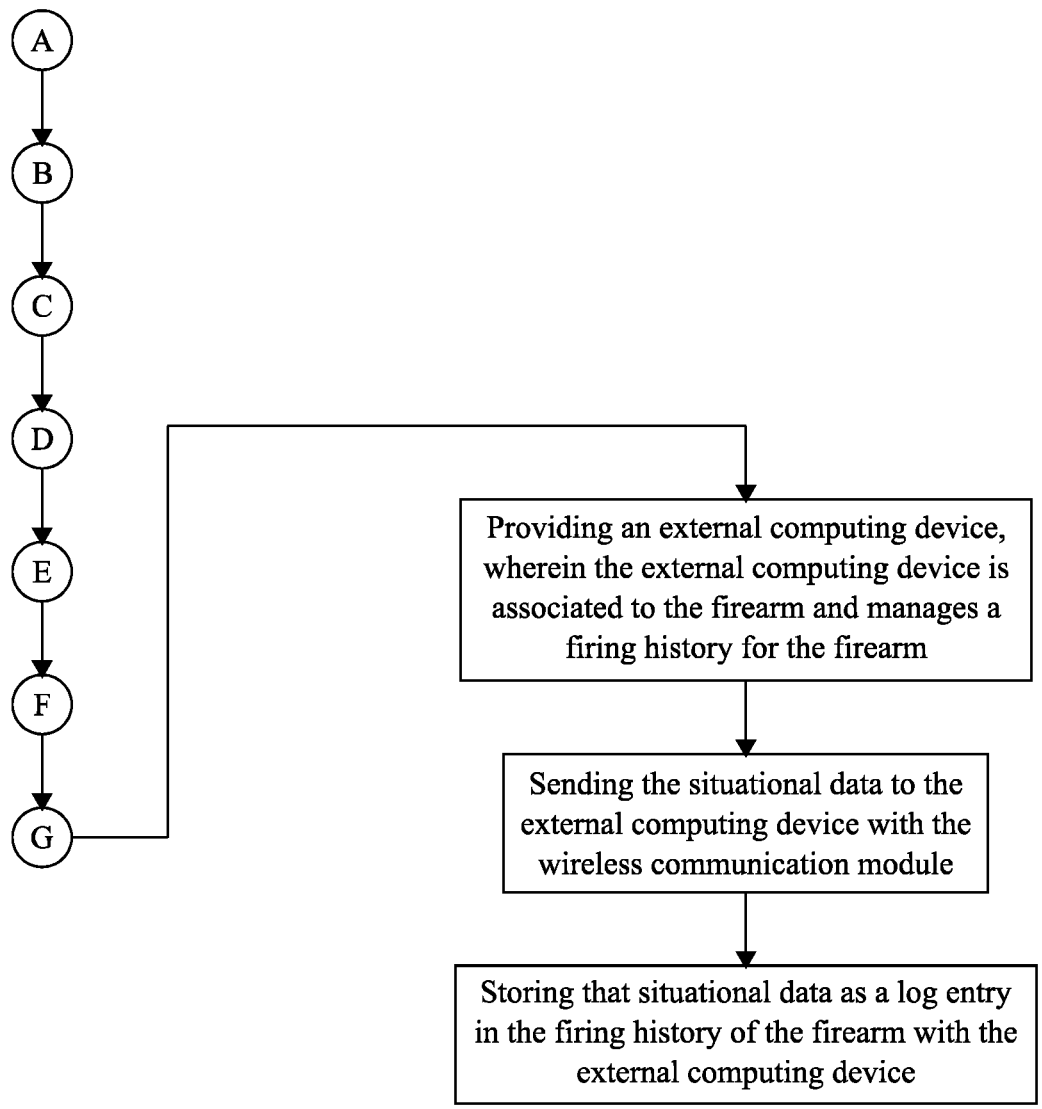
FIG. 14 is a flowchart illustrating steps associated with archiving the situational data on an external computing device.
Figure 15:
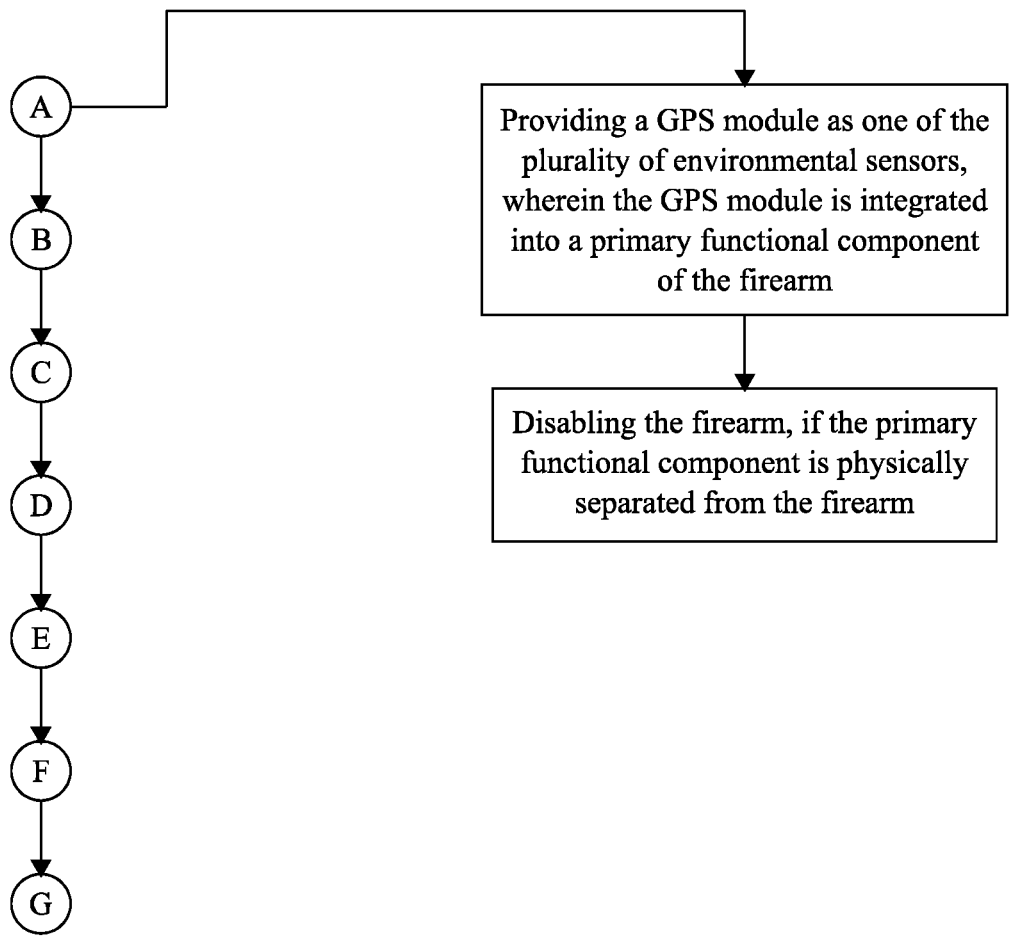
FIG. 15 is a flowchart illustrating steps associated with integrating the GPS module in a primary functional component of the "smart" firearm.
Figure 16:
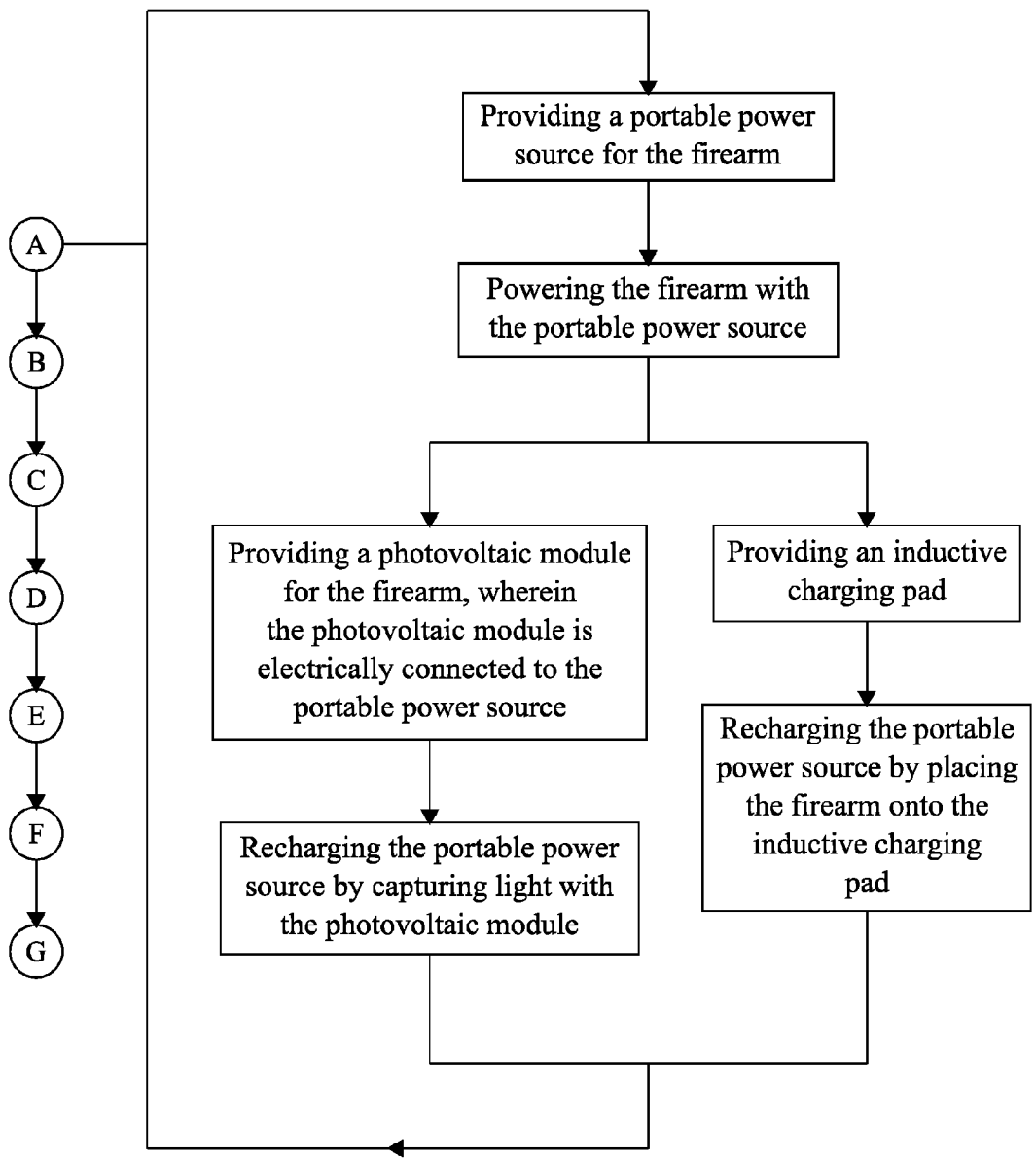
FIG. 16 is a flowchart illustrating steps associated with charging the "smart" firearm's portable power source.
Figure 17:
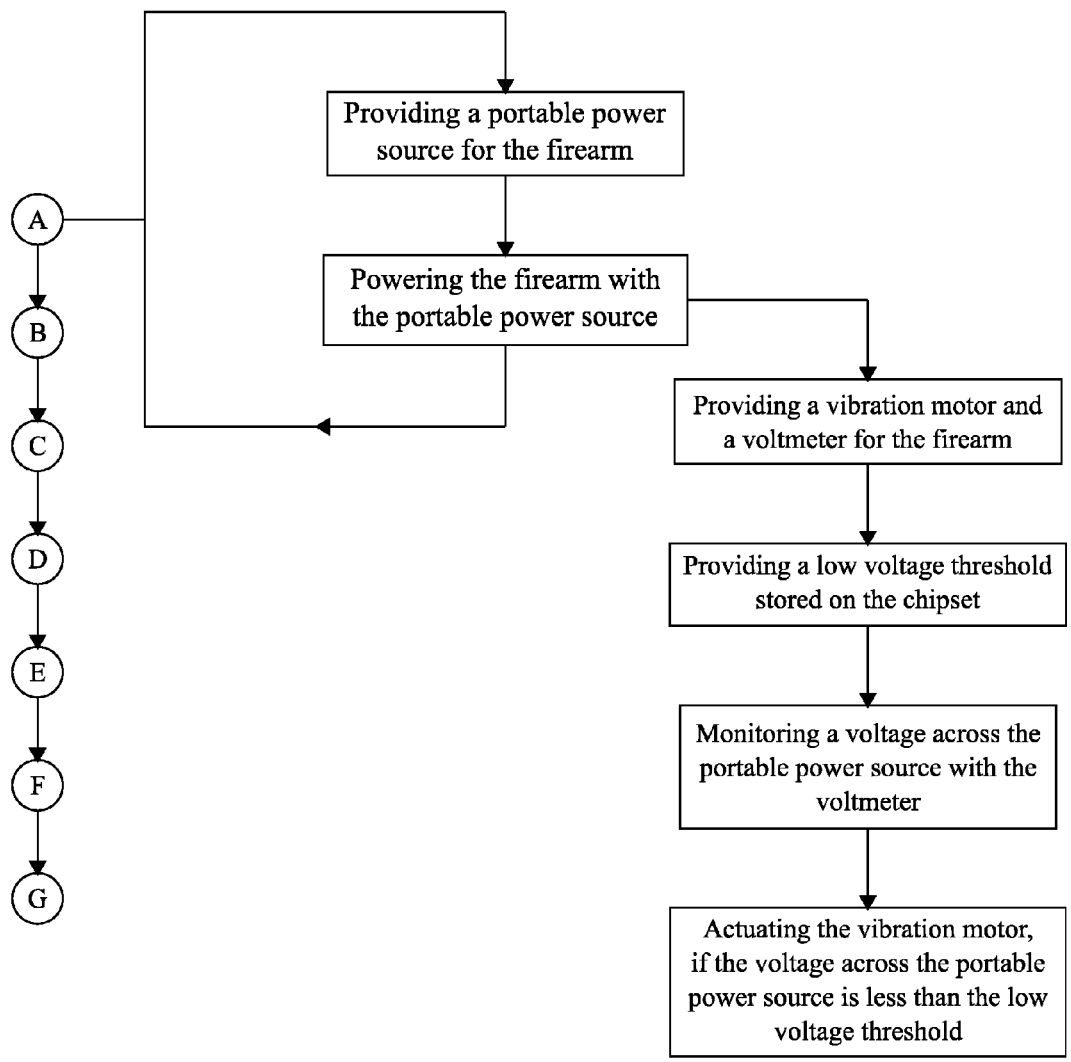
FIG. 17 is a flowchart illustrating steps warning that the "smart" firearm's portable power source is at low power.
Figure 18:
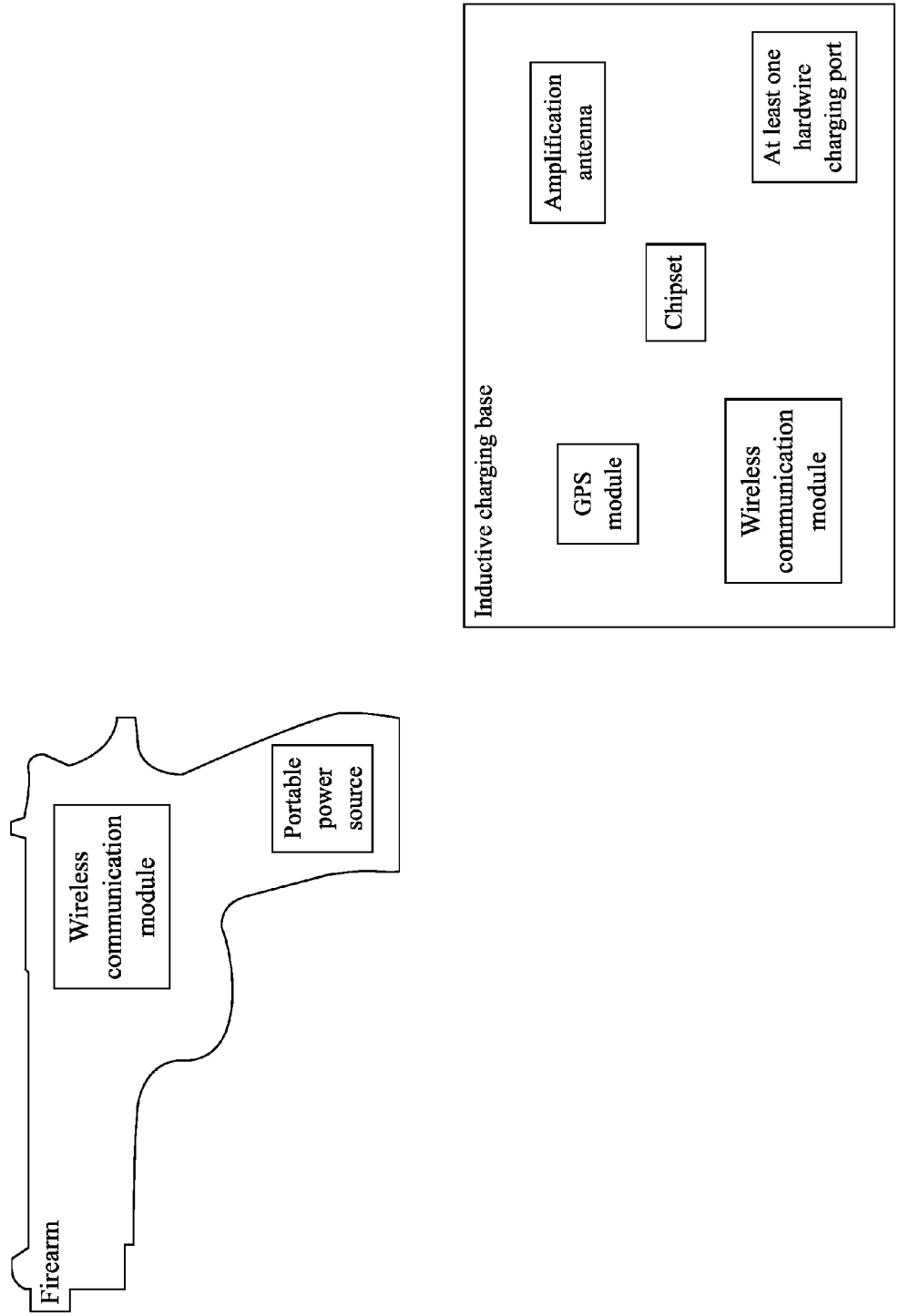
FIG. 18 is a block diagram of the system between the "smart" firearm and the inductive charging base.
Figure 19:
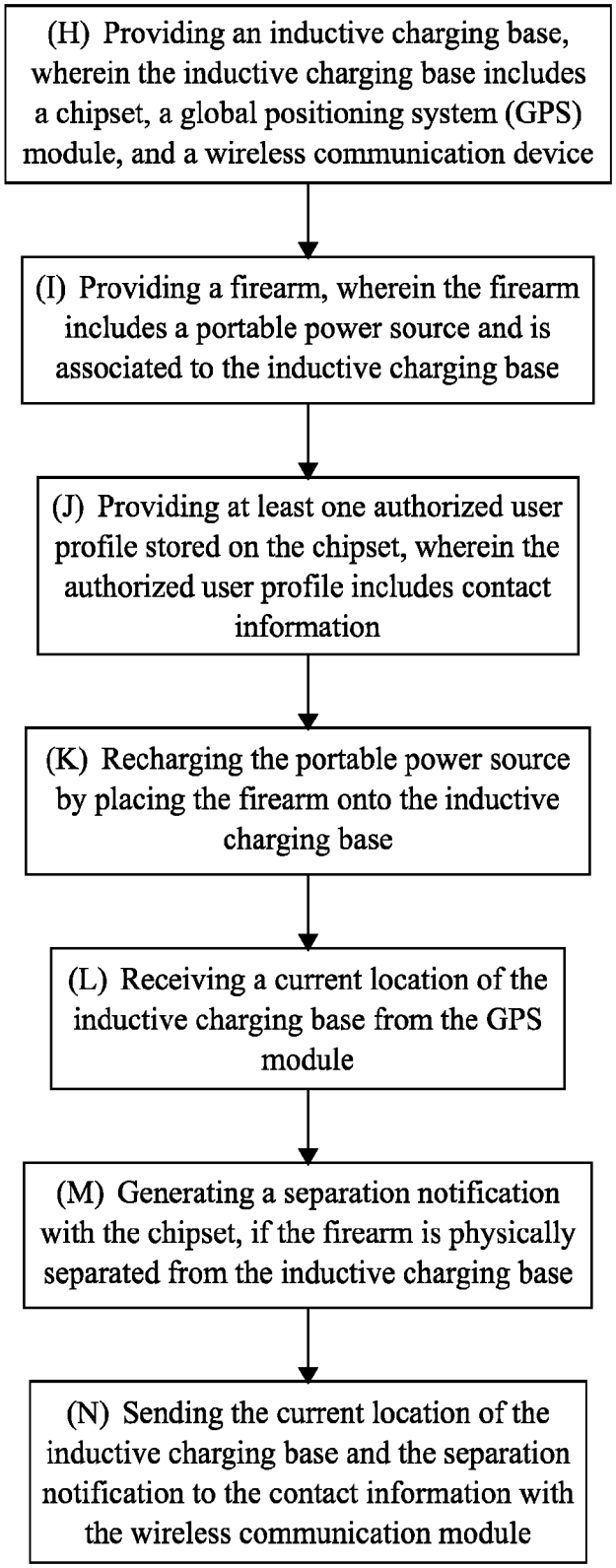
FIG. 19 is a flowchart illustrating the overall process of using the "smart" firearm with the inductive charging base.
Figure 20:
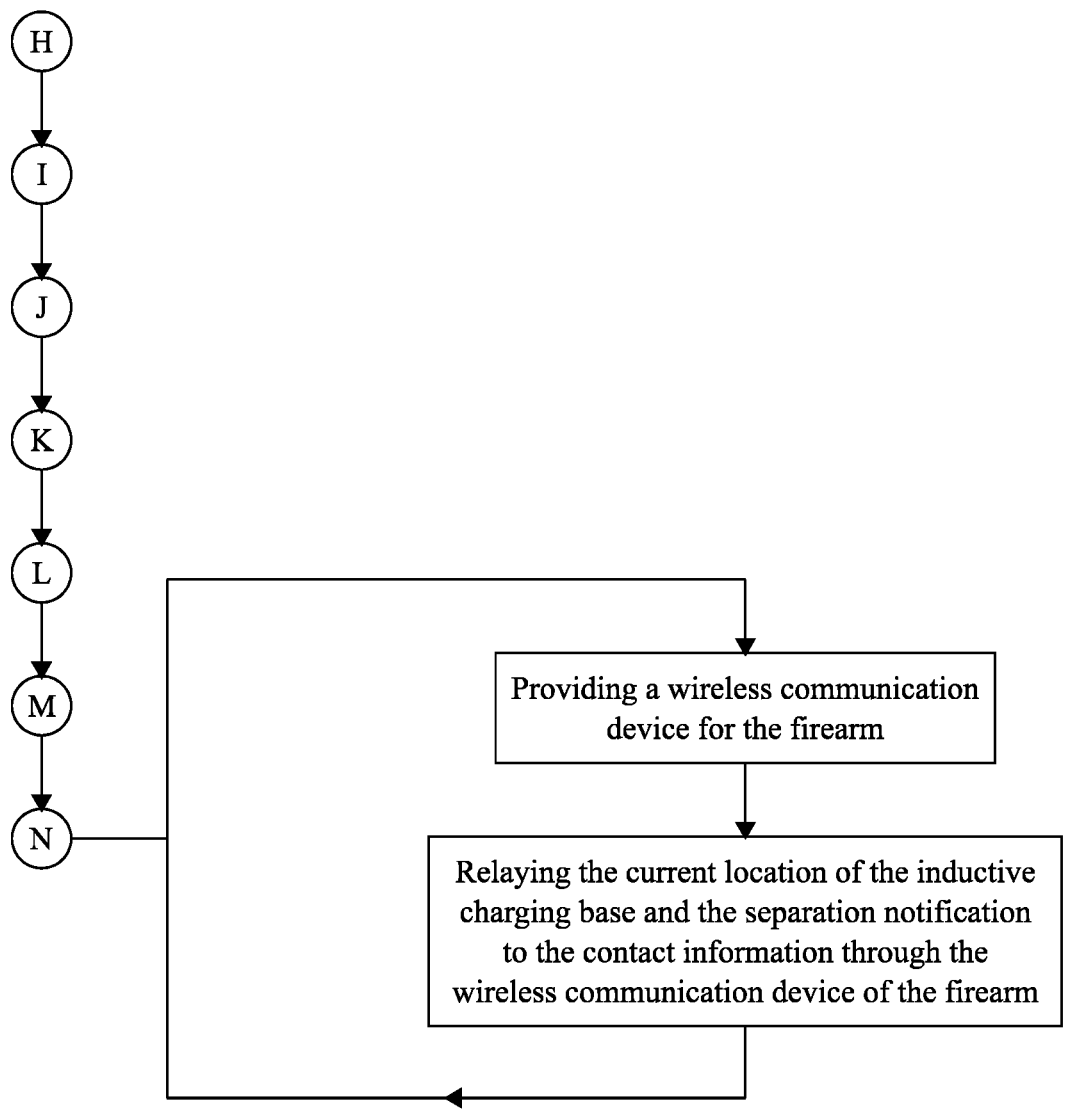
FIG. 20 is a flowchart illustrating steps associated with using the "smart" firearm as a hotspot for the inductive charging base.
Figure 21:
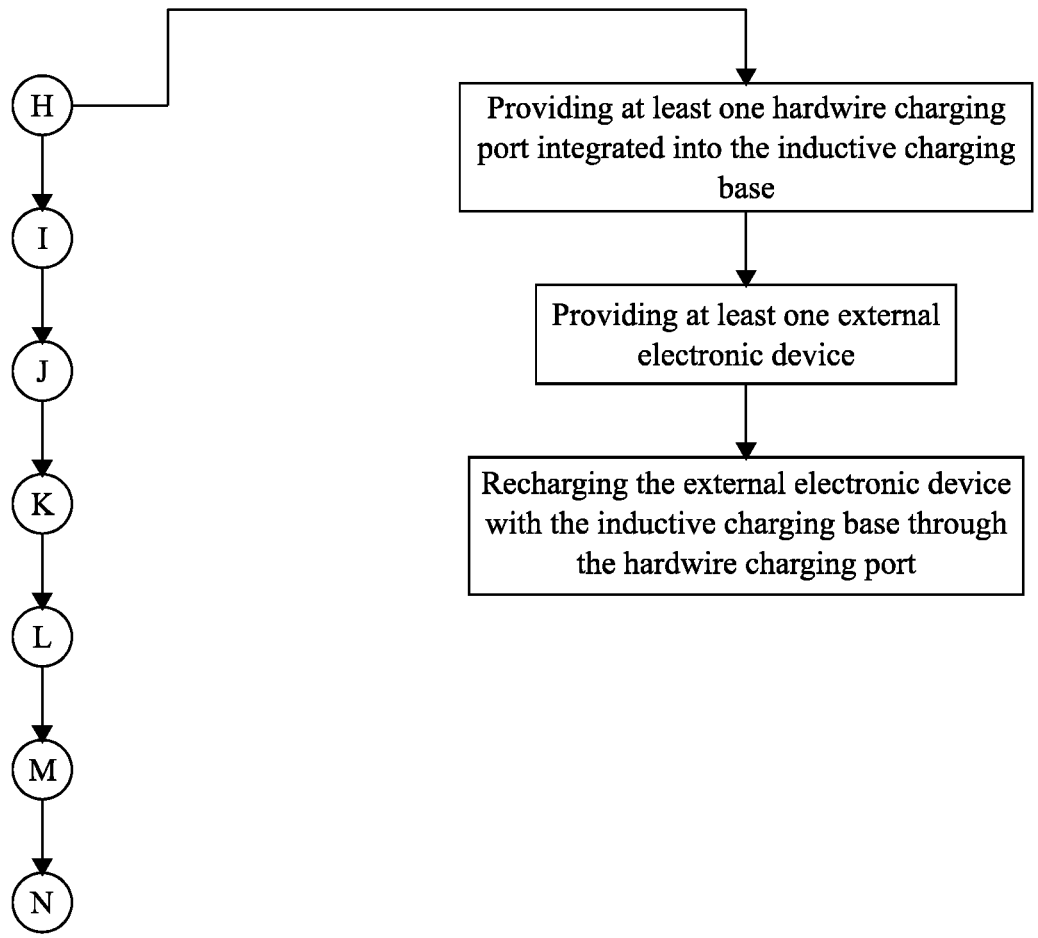
FIG. 21 is a flowchart illustrating steps associated with charging an external electronic device through a hardwire connection.
Figure 22:
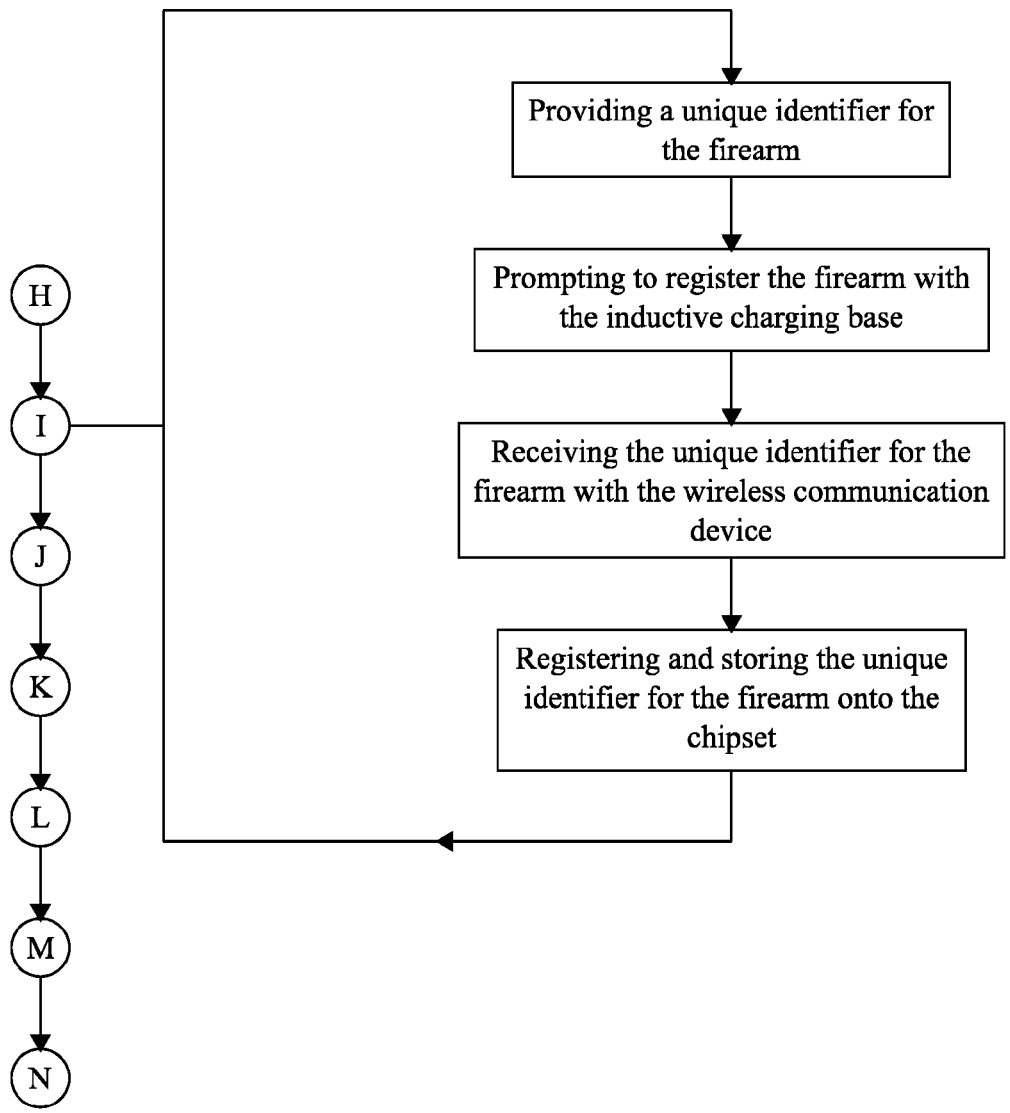
FIG. 22 is a flowchart illustrating steps associated with registering the "smart" firearm to the inductive charging base.
Figure 23:
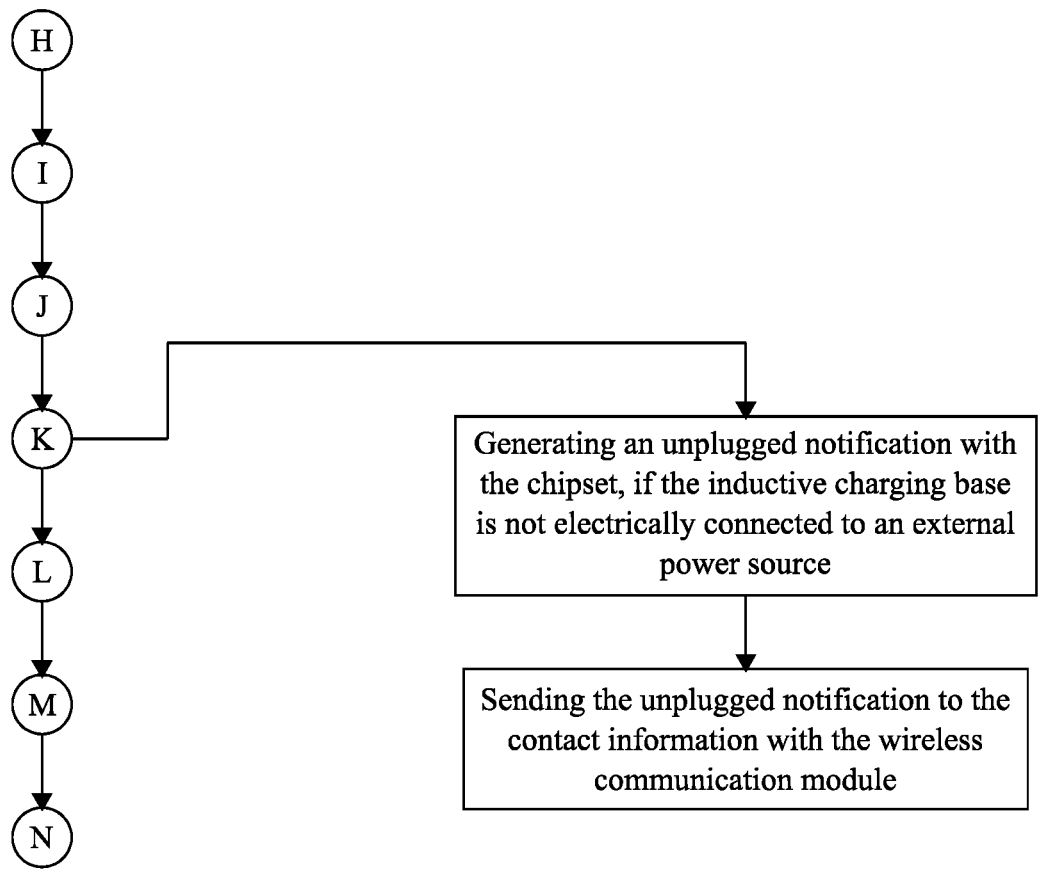
FIG. 23 is a flowchart illustrating steps associated with notifying if the inductive charging base is not electrically connected to an external power source.
Figure 24:
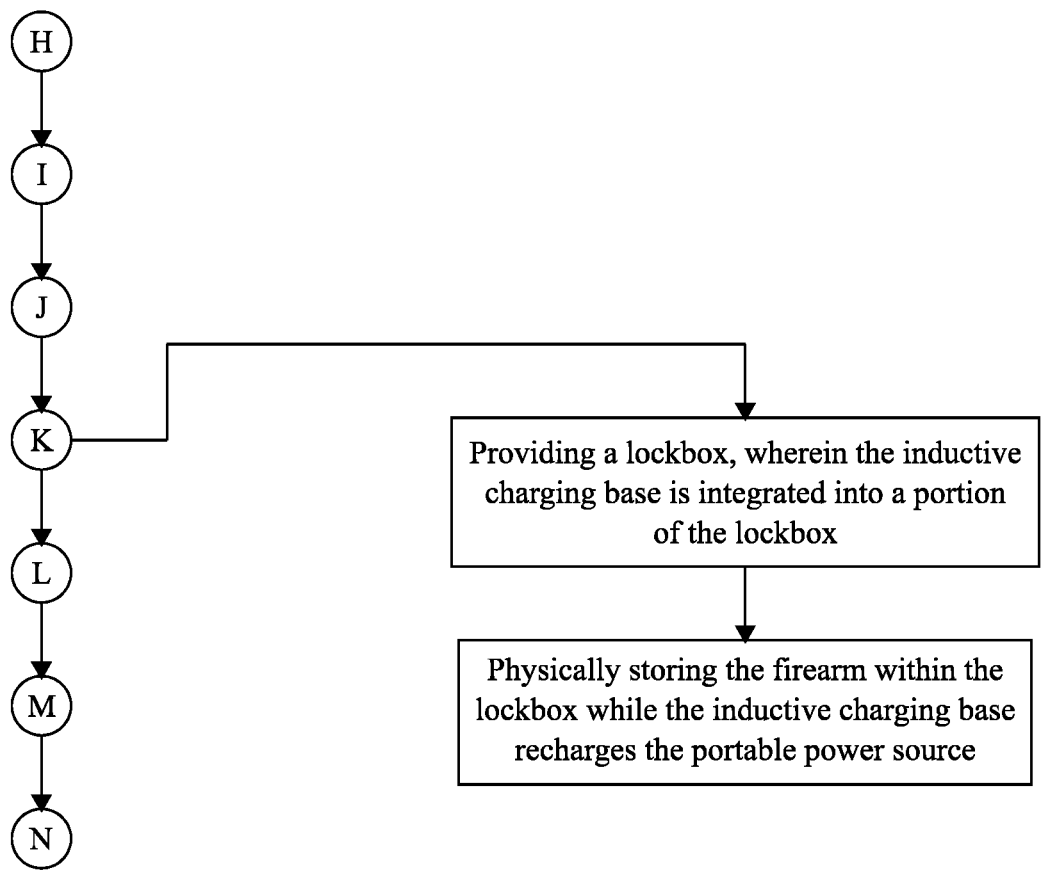
FIG. 24 is a flowchart illustrating steps associated with configuring the inductive charging pad into a lockbox.
Figure 25:
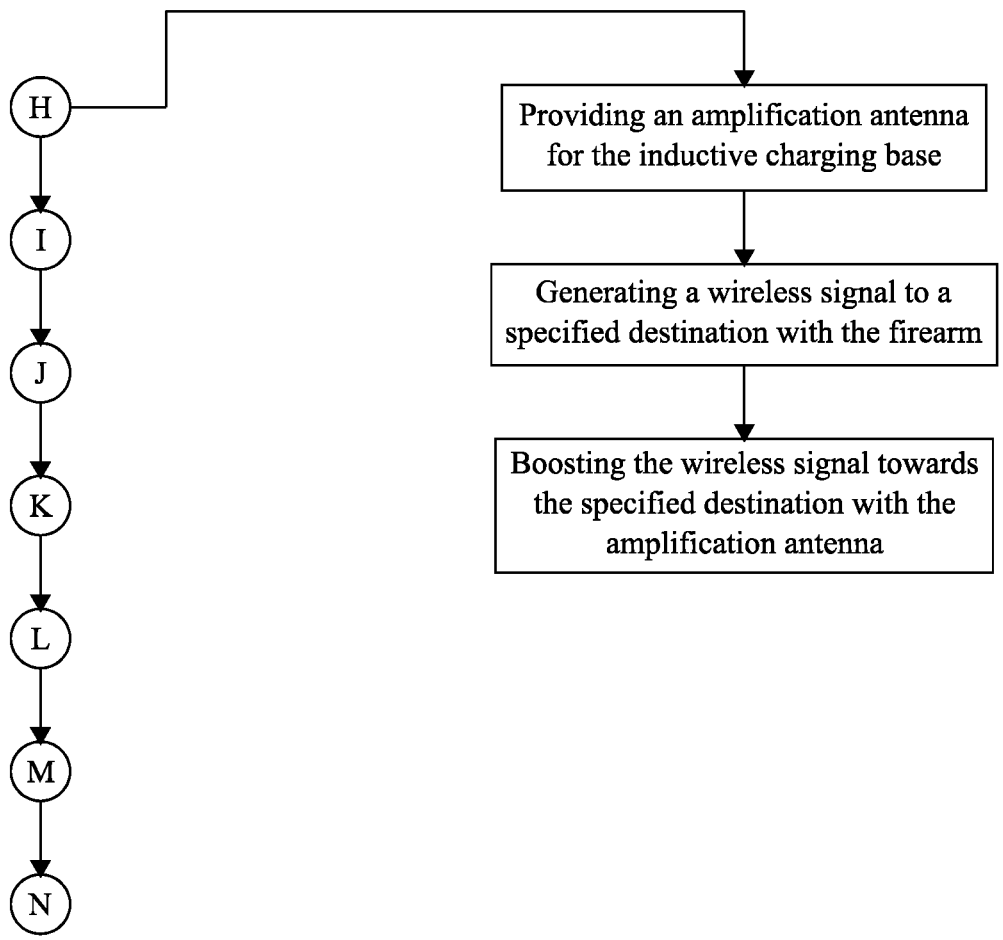
FIG. 25 is a flowchart illustrating step associated with configuring the inductive charging base with an amplification antenna.
Figure 26:
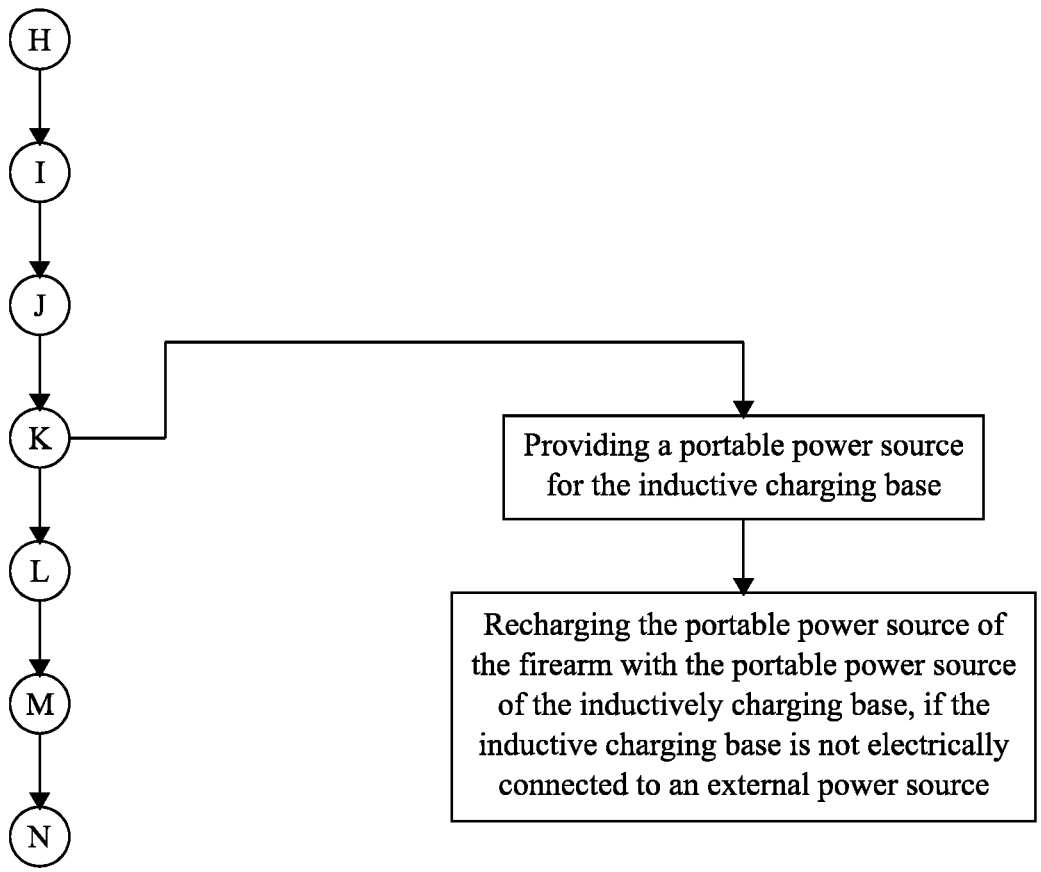
FIG. 26 is a flowchart illustrating step associated with configuring the inductive charging base with its own portable power source.

All illustrations of the drawings are for the purpose of describing selected versions of the present invention and are not intended to limit the scope of the present invention.

The present invention is a system and a method of monitoring a firearm that provides numerous safety measures such as preventing accidental shootings by the firearm and deterring unauthorized persons from using the firearm. The present invention accomplishes these numerous safety measures by integrating components into the firearm that enable certain "smart" safety features and by using certain accessories with the firearm that provide more information about the firearm. The system of the present invention that enables those "smart" features includes a chipset, a wireless communication module, a plurality of environmental sensors, a biometric scanner, and a trigger-locking mechanism, which are integrated into the firearm (Step A). The chipset is a collection of integrated circuits that allow the firearm to utilize computer-executable functions such as storing and processing data. The chipset includes, but is not limited to, a processor and a data storage medium. The wireless communication module allows the firearm to send and receive data from other electronic devices. The wireless communication module allows for data to be transferred through email, short message service (SMS), "short-link" radio technology, or any other form of wireless communication. The plurality of environmental sensors is used to monitor the physical circumstances of the firearm in relation to its surroundings. The biometric scanner allows the firearm to verify that an authorized person is handling the firearm. Finally, the trigger-lock mechanism is used to mechanically lock the trigger of the firearm so that an unauthorized person cannot pull the trigger of the firearm.

The method of monitoring and trigger-locking the firearm follows an overall process in order to implement the chipset, the wireless communication module, the plurality of environmental sensors, the biometric scanner, and the trigger-locking mechanism. For the overall process, at least one authorized user signature is stored on the chipset (Step B). The authorized user signature is used to biometrically identify a person authorized to use the firearm. The authorized user signature is preferably a palm-print, however, the firearm can be configured to receive other kinds of authorized user signatures such as fingerprints or retinal scans. More than one authorized user signature can be stored on the chipset, which allows more than one person to be authorized to use the firearm. The overall process begins by receiving an unidentified biometric reading through the biometric scanner and recording the unidentified biometric reading with the chipset (Step C), which typically occurs when a person picks up or handles the firearm. The unidentified biometric reading is the raw detection data from the biometric scanner and has yet to be identified as coming from an authorized user or coming from an unauthorized user. If the chipset determines that the unidentified biometric reading does not match the authorized user signature, then the present invention actuates the trigger-locking mechanism (Step D) so that an unauthorized person cannot pull the trigger of the firearm. Also in response to the unauthorized person handling the firearm, the chipset generates an unauthorized-use notification, which is broadcast by the wireless communication module (Step E). This allows an authorized person to be notified when an unauthorized person has picked up or is handling the firearm. Again, the wireless communication module can be used to send the unauthorized-use notification through email, SMS, or any other form of wireless communication.

Alternatively, if the chipset determines the unidentified biometric reading does match the authorized user signature during the overall process, then the present invention releases the trigger-locking mechanism (Step F) so that the person handling the firearm is able to readily pull the trigger of the firearm. The overall process continues by collecting situational data from the environmental sensors and by recording the situational data with the chipset when the firearm discharges a round (Step G). The situational data allows the present invention to keep track of the circumstances related to the discharged round. Step G is typically executed when the unidentified biometric reading matches the authorized user signature. However, an unauthorized person may be able to physically disable the trigger-locking mechanism and may be able to discharge a round from the firearm. In this case, the present invention still executes Step G so that the situational data for the discharged round can still be collected by the present invention.

The biometric scanner can be configured into multiple embodiments. The preferred embodiment of the biometric scanner is a palm-print reader in Step A because the biometric scanner can more efficiently and more accurately read a palm-print as a person handles the firearm. Consequently, the palm-print reader is integrated onto a grip of the firearm so that the palm-print reader is able to immediately scan a palm-print as a person picks up the firearm. In addition, an authorized palm-print is provided as the authorized user signature in Step B, and an unidentified palm-print is received as the unidentified biometric reading in Step C. However, an alternative embodiment of the biometric scanner can also be a fingerprint reader in an alternative embodiment in Step A because the biometric scanner can efficiently and accurately read a fingerprint as a person touches the trigger of the firearm. Consequently, the fingerprint reader is integrated onto the trigger of the firearm so that the fingerprint reader is able to scan a fingerprint as the person handling the firearm gets ready to pull the trigger. Similar to how the palm-print reader altered Steps B and C, an authorized fingerprint is provided as the authorized user signature in Step B, and an unidentified fingerprint is provided as the unidentified biometric reading in Step C.

When the unidentified biometric reading does not match the authorized user signature during Step E, the present invention notifies a person authorized to use the firearm about where to locate the firearm. Thus, a global positioning system (GPS) module is required to be one of the plurality of environmental sensors for the firearm. The current location of the firearm is received through the GPS module, and the current location of the firearm and the unidentified biometric reading are added to the unauthorized-use notification with the chipset during Step E, which allows the person authorized to use to the firearm to be completely informed about their potentially stolen firearm when the unauthorized-use notification is broadcasted by the wireless communication module.

Moreover, the unauthorized-use notification is broadcasted by the wireless communication device so that more people are notified that an unauthorized person is handling the firearm. For example, if a police officer's firearm is stolen by a perpetrator, then the present invention allows other police officers in the area to be aware of the stolen firearm. However, the present invention is also able to directly notify a person authorized to handle the firearm. In order to directly notify such person, the present invention needs to be provided with contact information for each authorized user signature. The contact information can be, but is not limited to, an authorized person's email address or an authorized person's cellular phone number for SMS. During Step E, the wireless communication device directly sends the unauthorized-use notification to the contact information in order to notify the person associated to the authorized user signature.

When the unidentified biometric reading does not match the authorized user signature, the present invention requires some kind of feedback from a person authorized to use the firearm. The present invention preferably allows for Step C through E to be repeated until the unidentified biometric reading that is received during Step C matches the authorized user signature. Consequently, the unauthorized-use notification is periodically or continuously broadcast until an authorized person is able to actually handle the firearm. Alternatively, the present invention allows the unauthorized-use notification to be periodically or continuously broadcast through the wireless communication module, until an authorized person is able to remotely disable the broadcasting of the unauthorized-use notification. Remote disabling of the unauthorized-use notification may be not be ideal for the present invention but is an option for the present invention.

The present invention allows the situational data in Step G to be gathered from different kinds of environmental sensors. One kind of environmental sensor is the aforementioned GPS module, which allows the firearm to track its current location. Thus, when the firearm discharges a round, the chipset receives the current location of the firearm from the GPS module and adds the current location of the firearm to the situational data. Another kind of environmental sensor is at least two gyroscopes being distributed along a barrel of the firearm. The at least two gyroscopes allows the chipset to receive barrel orientation data of the firearm when the firearm discharges a round. The chipset is then able to extrapolate trajectory data of the discharged round from the barrel orientation data and is able add the trajectory data of the discharged round to the situational data. Another kind of environmental sensor is an accelerometer, which allows the firearm to track its acceleration and deceleration. Consequently, the chipset is able to derive the spatial positioning data of the firearm through the accelerometer when the firearm discharges a round. The chipset then converts the spatial positioning data into recoil tracking data for the firearm and adds the recoil tracking data to the situational data. The recoil tracking data can be used to determine a recoil distance of the firearm as the firearm discharges the round. A longer recoil distance indicates that the firearm was not held firm while discharging the round and that the round may have been accidently discharged by the firearm. A shorter recoil distance indicates that the firearm was held firm while discharging the round and that the round may have been purposefully discharged by the firearm.

The environmental sensors provide pieces of information to be added to the situational data that can be used to help understand the circumstances surrounding the discharged round of the firearm. In addition, the situational data needs to describe when the firearm discharged the round. Consequently, the chipset is able to internal track and record the calendar date and a discharged time for the round. The chipset then adds the calendar date and the discharged time of the round to the situational data so that the situational data is able to paint a complete picture of when and why the firearm discharged the round.

The present invention uses a variety of methods to share the situational data with a person investigating the firing history of the firearm. One method of sharing the situational data is to communicate the situational data to a person associated with the authorized user signature. As described before, the chipset is used to store contact information associated to the authorized user signature. This allows the wireless communication module to send the situational data collected during Step G to the contact information so that the person authorized to use the firearm is able to access and view the situational data surrounding the discharged round. Another method of the sharing the situational data is to access and view the situational data stored on the chipset with a personal computing (PC) device such as a smartphone, a tablet PC, a laptop, or a desktop. Thus, the firearm needs to have a data-transferring port such as a universal serial bus (USB) port, and the data-transferring port needs to be electronically connected to the chipset. This allows the situational data to be sent to the PC device through a hardwire connection from the data-transferring port. The hardwire connection is preferably through a USB cable. The situational data can then be accessed and displayed through the PC device. For example, a detective would be able to investigate the firing history of the firearm by simply connecting their PC device into the data-transferring port of the firearm and viewing the situational data through their PC device. Another method of sharing the situational data is to upload the situational data onto an external computing device such a central database server, which is associated to the firearm and is used to manage the firing history of the firearm. Thus, the wireless communication module sends the situational data to the external computing device, and then the external computing device stores the situational data as a log entry within the firing history of the firearm so that someone may search, access, and view any log entry containing situational data from the external computing device.

The present invention uses the GPS module as an important environmental sensor for the firearm because the GPS module can be used to track the current location of the firearm and can be used to determine where a round was discharged by the firearm. The preferred embodiment of the firearm integrates the GPS module into a primary functional component of the firearm such as the firing pin of the firearm. This allows the present invention to disable the firearm from discharging any rounds if the primary functional component is physically separated from the firearm. For example, if the GPS module is integrated into the firing pin of the firearm, then the firearm cannot discharge any rounds unless the GPS module is actively tracking its current location.

In addition, the firearm is provided with a portable power source because the firearm is relatively mobile in the context of the present invention. The portable power source is used to power the chipset, the wireless communication module, the plurality of environmental sensors, the biometric scanner, the trigger-locking mechanism, and other electronic componentry of the firearm. The present invention also provides the firearm with a vibration motor and a voltmeter in order to alert the person handling the firearm about how the portable power source needs to be recharged soon. Thus, the voltmeter continuously monitors the voltage across the portable power source, and if the voltage across the portable power source is less than a low voltage threshold, then the chipset actuates the vibration motor. The actuation of vibration motor provides the user handling the firearm with haptic response that alerts the user to the fact that the portable power source is at the low power threshold. The low power threshold is the minimum amount of required power to keep the electronic componentry of the firearm functioning and is stored on the chipset. Moreover, the portable power source can be recharged through different mechanisms. One such mechanism is a photovoltaic module that is electrically connected to the portable power source and recharges the portable power source by capturing the light surrounding the firearm. Another such mechanism is an inductive charging base that recharges the portable power source by simply placing either the safety beacon or the firearm onto the inductive charging base.

The system of the present invention that enables more information to be gathered about the firearm includes the aforementioned inductive charging base that is capable of certain computer-executable functions. In order to gather more information about the firearm, the inductive charging base needs to be similarly provided with a chipset, a GPS module, and a wireless communication device (Step H). The inductive charging base also needs to be associated with the firearm so that an authorized person is notified when the firearm has been willingly or unwillingly separated from the inductive charging base. Thus, the chipset of the inductive charging source needs to store at least one authorized user profile that is used to identify the authorized person of the firearm (Step J). The authorized user profile includes the contact information of the authorized person such as their email address or their cellular phone number for SMS.

The method of monitoring and inductively charging the firearm follows an overall process in order to notify an authorized user when the firearm is separated from the inductive charging base. The overall process begins by recharging the portable power source by placing the firearm onto the inductive charging base (Step K), which indicates to the chipset that the firearm is in an inactive state or an "at home" state. Whether the firearm is separated from the inductive charging base or not, the chipset of the inductive charging base continuously receives the current location of the inductive charging base (Step L). This either allows the authorized user to confirm that the firearm is on the inductive charging base or allows the authorized user to be notified of the current location of the inductive charging base while separated from the firearm. The overall process continues by generating a separation notification with the chipset, if the firearm is physically separated from the inductive charging base (Step M). The chipset can determine that the firearm is physically separated from the inductive charging base in one of two ways. One way is to compare the current location of the firearm and the current location of the inductive charging base from their respective GPS modules. The other way is to have an indication of when the inductive charging base stops recharging the portable power source of the firearm. The overall process concludes by sending the current location of the inductive charging base and the separation notification to the contact information with the wireless communication device of the inductive charging base (Step N), which notifies the authorized user that the firearm has been removed from the inductive charging base.

The chipset of the inductive charging base needs to be able to individually identify the firearm in order to send the separation notification to the authorized user. Thus, the chipset of the inductive charging base prompts to register the firearm with the inductive charging base. Once a unique identifier for the firearm is received by the wireless communication device of the inductive charging base, then the chipset of the inductive charging base registers and stores the unique identifier for the firearm so that the separation notification is sent to the authorized user according to Steps I through N. The unique identifier is preferably a serial code or number etched into the firearm.

During Step N, the wireless communication module of the firearm can be used to relay the current location of the inductive charging base and the separation notification to the contact information of the authorized person. For example, if the wireless communication device of the inductive charging device is used to Bluetooth pair the firearm to the inductive charging device, then the wireless communication device of the firearm can be used to send the separation notification to its proper remote location. In essence, the wireless communication device of the firearm can be used as a Wi-Fi hotspot for the inductive charging base.

The inductive charging base should be able to recharge at least one external electronic device other than the firearm through a hardwire connection. The external electronic device can be, but is not limited to, a cellular phone, a tablet PC, and a laptop. Thus, at least one hardwire charging port is integrated into the inductive charging base. The at least one hardware charging port preferably a USB port. The inductive charging base can act as a recharging hub for all of the authorized person's electronic devices by being able to recharge the external electronic device with the inductive charging base through the hardwire charging port.

In addition to the separation notification, the chipset of the inductive charging base generates an unplugged notification when the inductive charging base is no longer electrically connected to an external power source (e.g. an electrical outlet). The unplugged notification is necessary to the present invention because the unplugged notification conveys to the authorized user that the firearm can only be recharged for a limited time hereinafter. Consequently, the wireless communication module of the inductive charging base sends the unplugged notification to the contact information associated to the authorized person. Similar to the separation notification, the wireless communication module of the firearm can also be used to relay the unplugged notification to the contact information of the authorized person.

In case the authorized person needs a secure portable container for their firearm, the inductive charging base can be integrated into a portion of the lockbox. The lockbox is able to physically store the firearm so that the firearm is securely contained within the lockbox while the inductive charging base is able to recharge the portable power source of the firearm. The lockbox is also able to physical store the external electrical device with the firearm while recharging the external electronic device through the hardwire recharging port. For example, the authorized person would be able to throw their tablet PC, their smart-phone, and their firearm into the lockbox in order to securely store those items while concurrently recharging the portable power source for each of those items.

The inductive charging base may also be provided with an amplification antenna. When the firearm generates a wireless signal (e.g. the unauthorized-use notification described above) to a specified destination, the amplification antenna is able to boost the wireless signal to the specified destination, which may be an email address, a cellular phone number for SMS, or some other address for wireless communication. If the inductive charging base is integrated into a portion of a lockbox, then the metal brackets that are peripherally located on the lockbox can be used as the amplification antenna.

In addition, the inductive charging base is provided with a portable power source because the inductive charging base can be relatively mobile in the context of the present invention. The portable power source of the inductive charging base is used to power its chipset, its wireless communication module, its GPS module, and other electronic componentry, if the inductive charging base is not electrically connected to an external power source (e.g. an electrical outlet). The portable power source of the inductive charging base is also used to recharge the portable power source of the firearm when the inductive charging base is not electrically connected to the external power source.

The present invention can also be used in conjunction with a method of preventing accidental shootings (hereinafter referred to as a hunter's beacon method), which requires a safety beacon and a firearm that has a computing device and a wireless receiver. This method begins by continuously transmitting a warning signal with the safety beacon and by continuously monitoring for the warning signal with the wireless receiver of the firearm. The method then processes the warning signal into an endangerment assessment with the computing unit, if the warning signal is captured by the wireless receiver. The endangerment assessment is used to determine whether or not it is safe to shoot the firearm based on the location of the safety beacon. Finally, the method executes a physical response with the firearm, if the endangerment assessment identifies a potentially unsafe situation between the safety beacon and the firearm. The physical response can be a tactile, auditory, or visual notification to the user of the potentially unsafe situation. The firearm from the present invention is able to receive wireless communication in regards to the hunter's beacon method.

Although the invention has been explained in relation to its preferred embodiment, it is to be understood that many other possible modifications and variations can be made without departing from the spirit and scope of the invention as hereinafter claimed.

What is claimed is:

1. A method of monitoring and trigger-locking a firearm, the method comprises the steps of:
   (A) providing a firearm, wherein the firearm includes a chipset, a wireless communication module, a plurality of environmental sensors, a biometric scanner, and a trigger-locking mechanism;
   (B) providing at least one authorized user signature, wherein the authorized user signature is stored on the chipset;
   (C) receiving an unidentified biometric reading through the biometric scanner and recording the unidentified biometric reading with the chipset;
   (D) actuating the trigger-locking mechanism for the firearm, if the unidentified biometric reading does not match the authorized user signature;
   (E) generating an unauthorized-use notification with the chipset and broadcasting the unauthorized-use notification with the wireless communication device, if the unidentified biometric reading does not match the authorized user signature; and
   (F) collecting situational data from the environmental sensors and recording the situational data with the chipset, if the firearm discharges a round.

2. The method of monitoring and trigger-locking a firearm, the method as claimed in claim 1 comprises the steps of:
   providing a palm-print reader as the biometric scanner during step (A), wherein the palm-print reader is integrated onto a grip of the firearm;
   providing an authorized palm-print as the authorized user signature during step (B); and
   receiving an unidentified palm-print as the unidentified biometric reading during step (C).

3. The method of monitoring and trigger-locking a firearm, the method as claimed in claim 1 comprises the steps of:
   providing a fingerprint reader as the biometric scanner during step (A), wherein the fingerprint reader is integrated onto a trigger of the firearm;
   providing an authorized fingerprint as the authorized user signature during step (B); and
   receiving an unidentified fingerprint as the unidentified biometric reading during step (C).

4. The method of monitoring and trigger-locking a firearm, the method as claimed in claim 1 comprises the steps of:
   wherein the unidentified biometric reading does not match the authorized user signature;
   providing a global positioning system (GPS) module as one of the plurality of environmental sensors;
   receiving a current location of the firearm from the GPS module; and
   adding the unidentified biometric reading and the current location of the firearm into the unauthorized-use notification with the chipset.

5. The method of monitoring and trigger-locking a firearm, the method as claimed in claim 1 comprises the steps of:
   providing contact information stored on the chipset, wherein the contact information is associated to the authorized user signature; and
   sending the unauthorized-use notification to the contact information with the wireless communication module, if the unidentified biometric reading does not match the authorized user signature.

6. The method of monitoring and trigger-locking a firearm, the method as claimed in claim 1 comprises the steps of:
   wherein the unidentified biometric reading does not match the authorized user signature; and
   repeating steps (C) through (E), until the unidentified biometric reading does match the authorized user signature.

7. The method of monitoring and trigger-locking a firearm, the method as claimed in claim 1 comprises the steps of:
   wherein the firearm discharges the round;
   recording a calendar date and a discharged time for the round with the chipset; and
   adding the calendar date and the discharged time for the round into the situational data with the chipset.

8. The method of monitoring and trigger-locking a firearm, the method as claimed in claim 1 comprises the steps of:
   wherein the firearm discharges the round;
   providing a GPS module as one of the plurality of environmental sensors;
   receiving a current location of the firearm from the GPS module; and
   adding the current location of the firearm into the situational data with the chipset.

9. The method of monitoring and trigger-locking a firearm, the method as claimed in claim 1 comprises the steps of:
   wherein the firearm discharges the round;
   providing at least two gyroscopes as one of the plurality of environmental sensors, wherein the at least two gyroscopes are distributed along a barrel of the firearm;
   receiving barrel orientation data of the firearm from the at least two gyroscopes;

extrapolating trajectory data for the round from the barrel orientation data with the chipset; and adding the trajectory data for the round into the situational data with chipset.

10. The method of monitoring and trigger-locking a firearm, the method as claimed in claim 1 comprises the steps of:

wherein the firearm discharges the round;

providing an accelerometer as one of the plurality of environmental sensors;

deriving spatial positioning data of the firearm through the accelerometer;

converting the spatial positioning data into recoil tracking data for the firearm with the chipset; and adding the recoil tracking data for the firearm to the situational data with the chipset.

11. The method of monitoring and trigger-locking a firearm, the method as claimed in claim 1 comprises the steps of:

providing contact information stored on the chipset, wherein the contact information is associated to the authorized user signature; and sending the situational data to the contact information with the wireless communication module.

12. The method of monitoring and trigger-locking a firearm, the method as claimed in claim 1 comprises the steps of:

providing a personal computing (PC) device;

providing a data-transferring port for the firearm, wherein the data-transferring port is electronically connected to the chipset;

sending the situational data to the PC device through a hardwire connection from the data-transferring port; and displaying the situational data through the PC device.

13. The method of monitoring and trigger-locking a firearm, the method as claimed in claim 1 comprises the steps of:

providing an external computing device, wherein the external computing device is associated to the firearm and manages a firing history for the firearm;

sending the situational data to the external computing device with the wireless communication module; and storing that situational data as a log entry in the firing history of the firearm with the external computing device.

14. The method of monitoring and trigger-locking a firearm, the method as claimed in claim 1 comprises the steps of:

providing a GPS module as one of the plurality of environmental sensors, wherein the GPS module is integrated into a primary functional component of the firearm; and disabling the firearm, if the primary functional component is physically separated from the firearm.

15. The method of monitoring and trigger-locking a firearm, the method as claimed in claim 1 comprises the steps of:

providing a portable power source for the firearm; and powering the chipset, the wireless communication module, the plurality of environmental sensors, the biometric scanner, and the trigger-locking mechanism with the portable power source.

16. The method of monitoring and trigger-locking a firearm, the method as claimed in claim 15 comprises the steps of:

providing a vibration motor and a voltmeter for the firearm;

providing a low voltage threshold stored on the chipset;

monitoring a voltage across the portable power source with the voltmeter; and actuating the vibration motor, if the voltage across the portable power source is less than the low voltage threshold.

17. The method of monitoring and trigger-locking a firearm, the method as claimed in claim 15 comprises the steps of:

providing a photovoltaic module for the firearm, wherein the photovoltaic module is electrically connected to the portable power source; and recharging the portable power source by capturing light with the photovoltaic module.

18. The method of monitoring and trigger-locking a firearm, the method as claimed in claim 15 comprises the steps of:

providing an inductive charging base; and recharging the portable power source by placing the firearm onto the inductive charging base.

* * * * *